United States Patent
Boardman et al.

(10) Patent No.: US 6,396,042 B1
(45) Date of Patent: May 28, 2002

(54) DIGITAL LASER IMAGE RECORDER INCLUDING DELAY LINES

(75) Inventors: John D. Boardman, Rockwall; Mervin L. Gangstead, Garland, both of TX (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/421,444

(22) Filed: Oct. 19, 1999

(51) Int. Cl.$^7$ .............................................. H01L 27/00

(52) U.S. Cl. ................................ 250/208.1; 250/201.5; 250/236

(58) Field of Search ........................ 250/208.1, 201.5, 250/578.1, 216, 566, 236, 570; 347/255, 256, 259, 231, 238; 369/179, 132, 116, 121, 103

(56) References Cited

U.S. PATENT DOCUMENTS

| | | |
|---|---|---|
| 1,792,264 A | 2/1931 | Alexanderson |
| 1,857,130 A | 5/1932 | Alexanderson |
| 1,973,203 A | 9/1934 | Goldberg et al. |
| 3,409,348 A | 11/1968 | Annis et al. ................. 350/254 |
| 3,600,507 A | 8/1971 | Newgard et al. .............. 178/6 |

(List continued on next page.)

FOREIGN PATENT DOCUMENTS

| | | | |
|---|---|---|---|
| CA | 2134325 | 1/2000 | |
| DE | 195 13 626 A 1 | 10/1995 | ........... G02B/26/10 |
| EP | 0 87 586 A1 | 9/1983 | |
| EP | 0 475 399 A2 | 3/1992 | |
| EP | 0 632 434 A1 | 1/1995 | ............ G11B/7/00 |
| IL | 105524 | 4/1993 | |
| WO | WO 94/20301 | 12/1994 | |

OTHER PUBLICATIONS

Tadao, Iwaki, Patent Abstracts of Japan, vol. 008, No. 175 (P–294), Publication No. 59068842, dated Apr. 18, 1984, G11B, 7/08//G11B 21/02.

Jahns, Jurgen and Susan J. Walker, "Two–Dimensional Array of Diffractive Microlenses Fabricated by Thin Film Deposition," *Applied Optics* 2 29.7 : 931–36, Mar. 1, 1990.

Buralli, Dale A., G. Michael Morris, and John R. Rogers, "Optical Performance of Holographic Kinoforms," *Applied Optics* 28.5 : 976–83, Mar. 1, 1989.

(List continued on next page.)

*Primary Examiner*—Que T. Le
(74) *Attorney, Agent, or Firm*—Baker Botts L.L.P.

(57) ABSTRACT

The digital laser image recorder includes a data manipulation and control system which may provide digital data to a digital light source for conversion to an analog modulated light beam. A scanner may also be provided to direct the light beam toward a writing surface which may be disposed on the interior of a rotatable cylinder. A film handling device operable to deliver sheet film to the writing surface may also deliver sheet film from the writing surface to an associated output tray after writing. In another embodiment, beam shaping optics may be provided to convert the analog modulated light beams to collimated beams of a predetermined size and circular distribution. The beam shaping optics may also incorporate a power control filter to control the intensity of the collimated beams. In yet another embodiment, a shutter may be provided. The shutter may have a reflective surface with a first position in which the shutter reflects the light beams away from the scanner, and a second position in which the light beams strike the scanner. A photodiode may also be provided to measure the intensity of the reflected light beams. In still another embodiment, focusing optics may be provided to focus the collimated beams to form laser beams which may be directed toward the scanner.

30 Claims, 14 Drawing Sheets

U.S. PATENT DOCUMENTS

| | | | |
|---|---|---|---|
| 3,651,256 A | 3/1972 | Sherman et al. | 250/327.2 |
| 3,737,575 A | 6/1973 | Kominami | 178/7.6 |
| 3,781,902 A | 12/1973 | Shim et al. | 346/24 |
| 3,816,659 A | 6/1974 | Landsman | 178/7.6 |
| 3,891,794 A | 6/1975 | Russell | 178/6.7 R |
| 3,925,607 A | 12/1975 | Hauber | 178/7.1 |
| 3,938,191 A | 2/1976 | Jarmy | 360/102 |
| 4,030,122 A | 6/1977 | Chemelli et al. | 358/127 |
| 4,067,021 A | 1/1978 | Baylis et al. | 346/76 |
| 4,090,031 A | 5/1978 | Russell | 358/130 |
| 4,131,916 A | 12/1978 | Landsman | 358/285 |
| 4,163,600 A | 8/1979 | Russell | 350/6.7 |
| 4,168,506 A | 9/1979 | Corsover | 346/108 |
| 4,171,902 A | 10/1979 | Imai et al. | 355/11 |
| 4,273,410 A | 6/1981 | Menkie | 350/6.2 |
| 4,320,488 A | 3/1982 | Russell | 369/44 |
| 4,321,700 A | 3/1982 | Russell | 369/44 |
| 4,426,696 A | 1/1984 | Brenden et al. | 369/112 |
| 4,479,147 A | 10/1984 | Rossini | 358/290 |
| 4,494,226 A | 1/1985 | Hazel et al. | 369/45 |
| 4,495,609 A | 1/1985 | Russell | 369/44 |
| 4,514,055 A | 4/1985 | Grant | 350/6.3 |
| 4,588,254 A | 5/1986 | Menke et al. | 350/6.7 |
| 4,595,957 A | 6/1986 | Holthusen | 358/290 |
| 4,609,259 A | 9/1986 | Suemitsu et al. | 350/417 |
| 4,621,892 A | 11/1986 | Kataoka | 350/6.3 |
| 4,633,455 A | 12/1986 | Hudson | 369/45 |
| 4,640,573 A | 2/1987 | Kataoka et al. | 350/6.1 |
| 4,689,291 A | 8/1987 | Popovic et al. | 430/321 |
| 4,737,447 A | 4/1988 | Suzuki et al. | 430/321 |
| 4,743,091 A | 5/1988 | Gelbart | 350/252 |
| 4,815,067 A | 3/1989 | Webster et al. | 369/97 |
| 4,844,568 A | 7/1989 | Suzuki et al. | 350/6.2 |
| 4,908,814 A | 3/1990 | Petrov et al. | 369/100 |
| 4,939,715 A | 7/1990 | Vogelgesang et al. | 360/93 |
| 4,958,338 A | 9/1990 | Miller | 369/59 |
| 5,025,157 A | 6/1991 | Katsuaki | 250/327.2 |
| 5,026,133 A | 6/1991 | Roddy et al. | 350/6.4 |
| 5,032,848 A | 7/1991 | Morita | 346/1.1 |
| 5,081,617 A | 1/1992 | Gelbart | 369/112 |
| 5,153,437 A | 10/1992 | Nishii et al. | 250/231.14 |
| 5,159,483 A | 10/1992 | Watanabe et al. | 359/210 |
| 5,177,724 A | 1/1993 | Gelbart | 369/44.16 |
| 5,216,534 A | 6/1993 | Boardman et al. | 359/209 |
| 5,216,544 A | 6/1993 | Horikawa et al. | 359/622 |
| 5,245,174 A | 9/1993 | Prikryl et al. | 250/201.5 |
| 5,291,392 A | 3/1994 | Gerber et al. | 364/167.01 |
| 5,319,393 A * | 6/1994 | Genovese | 346/108 |
| 5,440,419 A | 8/1995 | Boardman et al. | 359/210 |
| 5,450,228 A | 9/1995 | Boardman et al. | 359/209 |
| 5,465,243 A | 11/1995 | Boardman et al. | 369/49 |
| 5,488,406 A | 1/1996 | Rubi | 347/259 |
| 5,502,709 A * | 3/1996 | Shinada | 369/119 |
| 5,508,837 A | 4/1996 | Gangstead et al. | 359/201 |
| 5,561,654 A | 10/1996 | Hamilton et al. | 369/97 |
| 5,636,049 A | 6/1997 | Kawata et al. | 359/211 |
| 5,905,851 A | 5/1999 | Morimoto et al. | 395/104 |
| 5,923,359 A * | 7/1999 | Montgomery | 347/255 |
| 5,933,278 A | 8/1999 | Plummer et al. | 359/627 |

OTHER PUBLICATIONS

Flood, Kevin M. and J. Michael Finian, "Multiple Phase Level Computer–Generated Holograms Etched in Fused Silica," *SPIE* 1052 : 91.6 (month unknown) 1989.

S. R. Perera, et al, "Optical Data Storage Topical Meeting," *SPIE* 1078 : 94–6, Jan. 1989.

Begley, David L., W.L. Casey, and D.W. Martin, "Aperture Shared Laser Diode Array Beam Combiner," *Applied Optics* 27.13 2685–87, Jul. 1, 1987.

Mansuripur, "Analysis of Astigmatic Focusing and Push–Pull Tracking Error Signals in Magnetooptical Disk Systems," *Applied Optics* 26.18 : 3981.86, Sep. 15, 1987.

Cheo, Peter K., *Fiber Optics Devices and Systems,* Englewood Cliffs: Prentics Hall, 1985 (month unknown).

Timoshenko, S. and J.N. Goodier, *Theory of Elasticity,* New York: McGraw–Hill, Feb. 1951.

Schott Glass Technologies, Inc., "Optical Glass," 16–8, 1987 (month unknown).

* cited by examiner

PLAN VIEW OF LINE-START DETECTOR OPTICS

SECTIONAL ELEVATION VIEW OF TRANSPORT
SHOWING LINE-START DETECTOR OPTICS

OPTICAL SCHEMATIC OF
LINE-START DETECTOR OPTICS

TURN-ON DELAY CHARACTERISTIC

TYPICAL LASER DIODE USE

LASER DIODE AT HIGH FREQUENCY

EFFECT OF INCREASING COMMANDED INTENSITY

EFFECT OF DECREASING
COMMANDED INTENSITY

DETAIL OF RISLEY PRISM INSTALLATION AND CONTROL

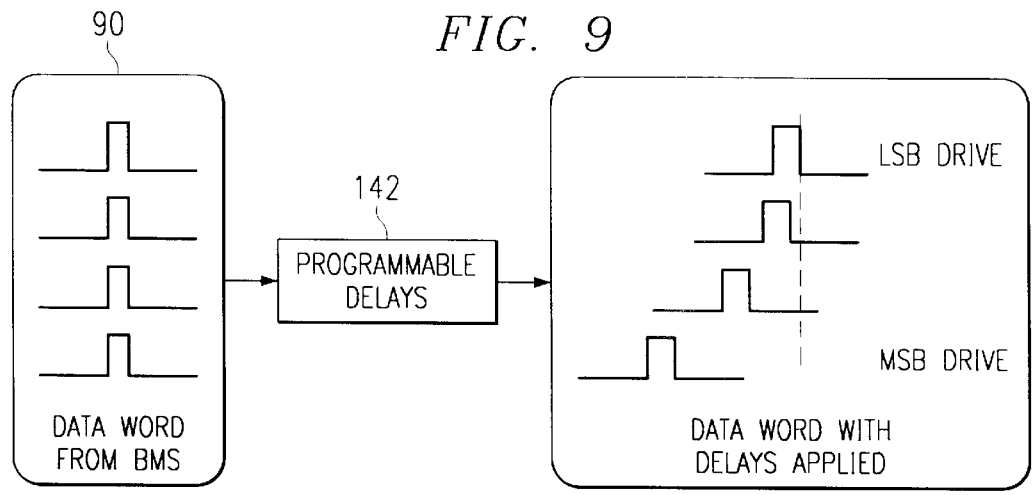
FIG. 9
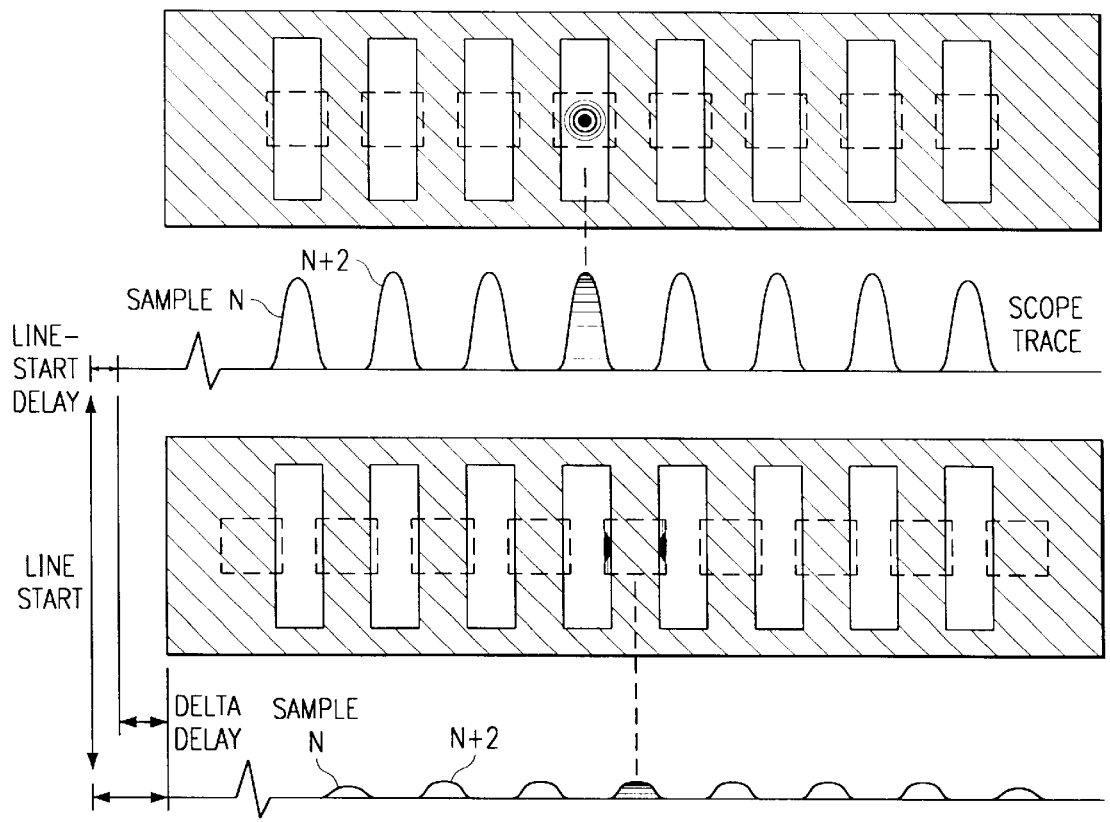
FIG. 10A
FIG. 10B

DIGITAL LASER IMAGE RECORDER INCLUDING DELAY LINES

TECHNICAL FIELD OF THE INVENTION

The present invention relates generally to an image recording apparatus and, more particularly, to a digital laser image recorder.

BACKGROUND OF THE INVENTION

Many systems are available for recording a digital laser image on a writing surface. Such systems may incorporate digital-to-analog converters. The analog signal may then be transformed into a continuous tone image.

SUMMARY OF THE INVENTION

In accordance with the teachings of the present invention, a digital laser image recorder is provided which substantially increases the speed, accuracy and efficiency of prior laser image recorders.

In accordance with one embodiment of the present invention, a digital laser image recorder includes a data manipulation and control system which may provide digital data to a digital light source for conversion to an analog modulated light beam. A scanner may also be provided to direct the light beam toward a writing surface which may be disposed on the interior of a stationary or moveable cylinder. A film handling device operable to deliver sheet film to the writing surface may also deliver sheet film from the writing surface to an associated output tray after writing.

In another embodiment, beam shaping optics may be provided to convert the analog modulated light beams to collimated beams of a predetermined size and circular distribution. The beam shaping optics may also incorporate a power control filter to control the intensity of the collimated beams.

In yet another embodiment, a shutter may be provided. The shutter may have a reflective surface which, in a first position, reflects the light beams away from the scanner and, in a second position, permits the light beams to strike the scanner. A photodiode may also be provided to measure the intensity of the reflected light beams.

In still another embodiment, focusing optics may be provided to focus the collimated beams to form laser beams which may be directed toward the scanner.

Traditional laser recording devices are limited by, among other things, their speed, accuracy and writing density. Technical advantages of the present invention include a digital laser image recorder with a nominal pixel writing density which may exceed six thousand pixels per inch. Each pixel in the image may also be encoded to approximately eleven bit accuracy.

Another technical advantage includes the reduction of diode interaction which may accompany analog modulated light beams emitted from laser diodes.

BRIEF DESCRIPTION OF THE DRAWINGS

For a more complete understanding of the present invention, and the advantages thereof, reference is now made to the following brief descriptions, taken in conjunction with the accompanying drawings and detailed description, wherein like reference numerals represent like parts, in which:

FIG. 9 illustrates aspects of programmable delays suitable for use with the digital laser image recorder of FIG. 1A;

FIG. 10A illustrates aspects of an alignment device suitable for use with the digital laser image recorder of FIG. 1A;

FIG. 10B illustrates additional aspects of an alignment device suitable for use with the digital laser image recorder of FIG. 1A;

DETAILED DESCRIPTION OF THE INVENTION

The preferred embodiments of the present invention and its advantages are best understood by referring now in more detail to FIGS. 1–12 of the drawings, in which like numerals refer to like parts.

Figure 1A:
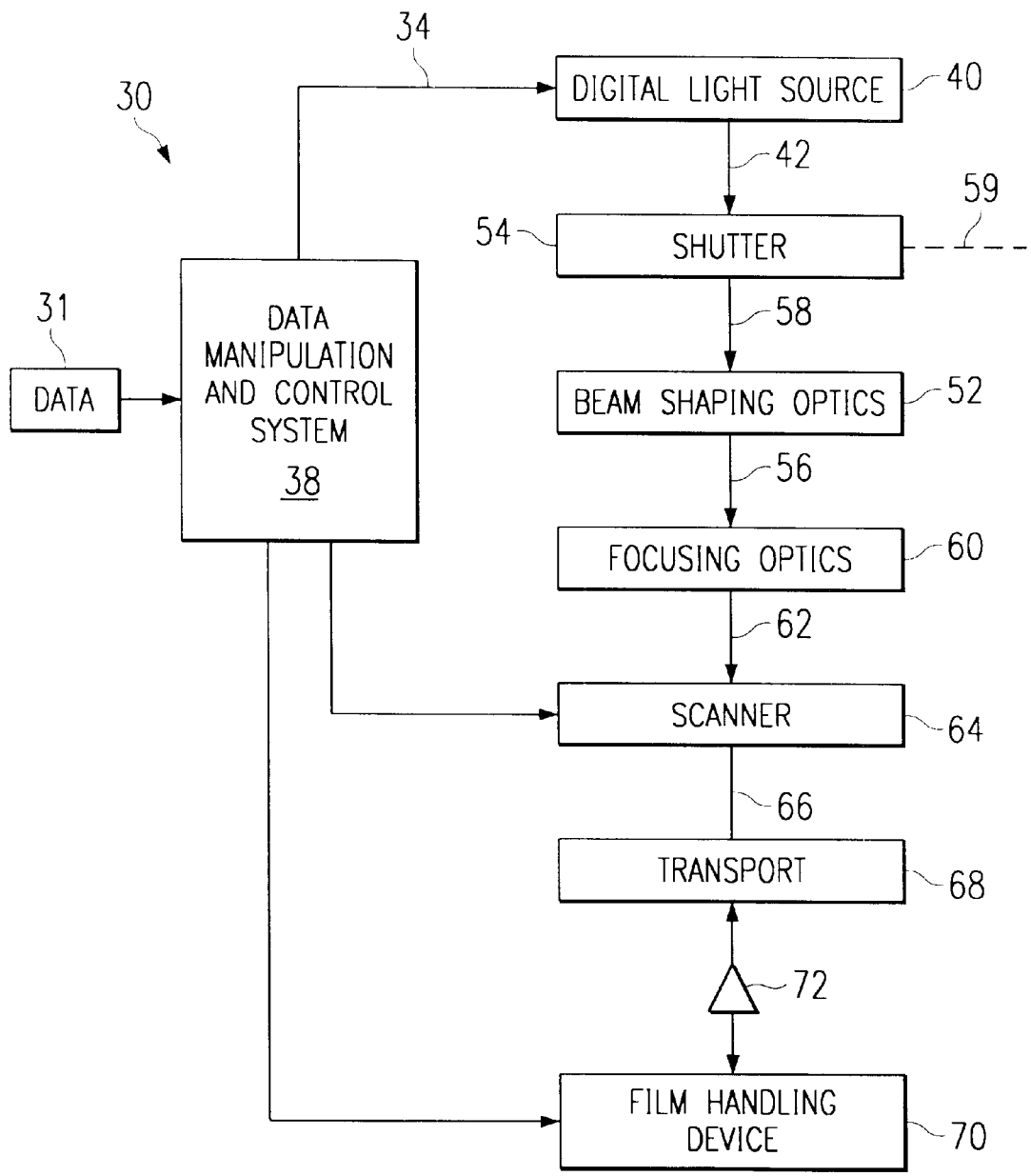
FIG. 1A illustrates one embodiment of a digital laser image recorder in accordance with the teachings of the present invention.

A digital laser image recorder (DLIR) incorporating aspects of the present invention is illustrated in FIG. 1A and generally designated by the reference numeral 30. DLIR 30 accepts data 31 and transforms it into a continuous tone image. The image may be written upon a curved writing platen using either a single or multifaceted scanner. In one embodiment, the nominal pixel writing density may exceed six thousand pixels per inch, and the transmission of each pixel in the image may be encoded to 11 bit accuracy. Various other writing densities in transmission and coding values may be achieved within the teachings of the present invention.

Digital data bitstream 34 is provided from data manipulation and control system 38 to digital light source 40. Data manipulation and control system 38 provides data processing and control of DLIR subsystems 36 to accomplish the image writing function. Digital light source 40 converts digital data bitstream 34 into analog modulated light beam 42 by actuating different combinations of diodes associated with digital light source 40, for each pixel, as appropriate. As will be described later in more detail, there are many ways to accomplish this function.

Figure 3:
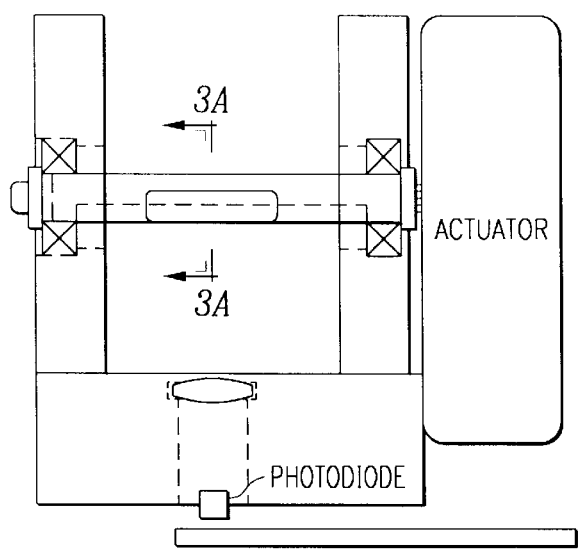
FIG. 3 is an elevational view, illustrating a shutter and photodiode suitable for use with the digital laser image recorder of FIG. 1A.
Figure 3A:
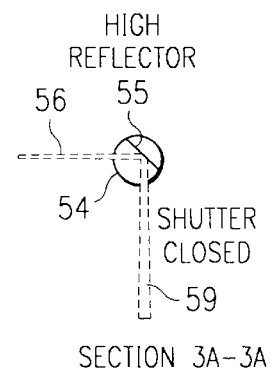
FIG. 3A is a cross-section taken through line 3A—3A of FIG. 3, illustrating the shutter in a closed position.
Figure 3B:
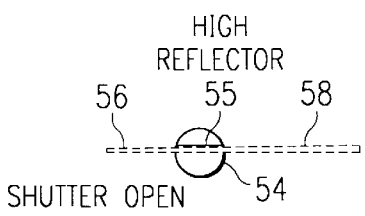
FIG. 3B is a cross-sectional view taken through 3A—3A of FIG. 3, illustrating the shutter in an open position.

A shutter 54 may be provided in order to selectively block light beam 42 when DLIR 30 is not writing. Shutter 54 includes a reflecting surface 55 operable to reflect light beams 42 in order to prevent beams 42 from ultimately reaching the writing surface, as illustrated in FIGS. 3–3B. When shutter 54 is closed, reflecting surface 55 directs blocked light beams 59 into a photodiode 57 as shown in the same figure. Photodiode 57 monitors the intensity of light beams 42 for diagnostic purposes. When shutter 54 is open, undeflected light beams 58 encounter beam shaping optics 52. When light beams 42 are diverted from reaching beam shaping optics 52 then DLIR 30 is not writing. For the purposes of this application, DLIR 30 is said to be "writing" when beams of light emitted from digital light source 40 ultimately strike a sheet of film, causing exposure of the film. This process creates an image on the film.

One or more undeflected light beams 58 encounter beam shaping optics 52 where undeflected light beams 58 are reshaped and expanded to produce one or more collimated beams 56 of a predetermined size and circular distribution, from each diode. Beam shaping optics 52 may also include a power control filter to control the intensity of the light reaching the writing platen.

Figure 2:
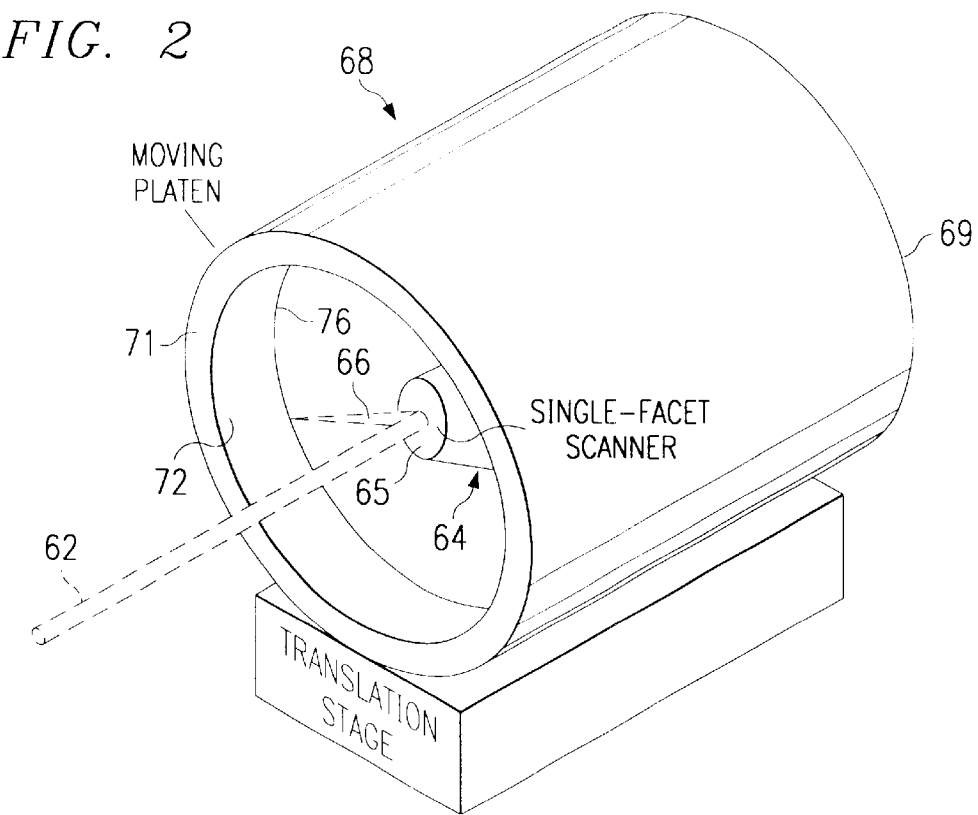
FIG. 2 is a perspective view, illustrating a film transport suitable for use with the digital image recorder of FIG. 1A.
Figure 2B:
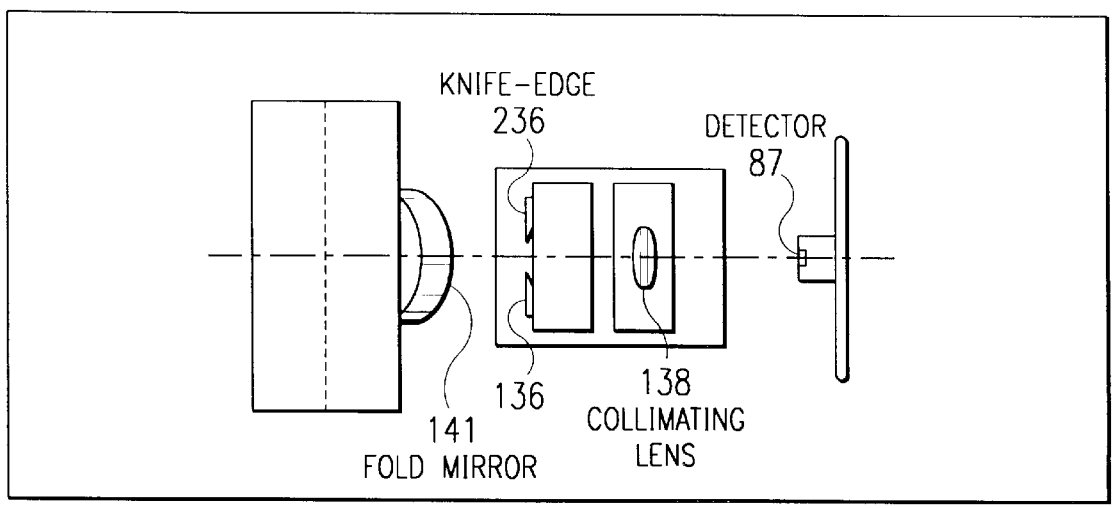
FIG. 2B illustrates a cross-sectional view, illustrating further aspects of the line-start detector of FIG. 2A.

Referring now to FIGS. 1A and 2, focusing optics 60 focus collimated beams 56 to provide focused laser beams 62 to a facet 65 associated with a scanner 64. Scanner 64 comprises a motor, a shaft and facet 65. The motor causes continuous rotation of the shaft, which translates into continuous rotation of facet 65. Scanner 64 is a very precise, air-bearing supporting shaft with reflective facet 65 mounted thereupon, at 45° to the axis of the shaft. The rotational speed of the motor is measured by an associated shaft encoder and controlled by electronics associated with the motor controller 35. DLIR 30 is configured such that focused laser beams 62 strike facet 65 during approximately 180° of its rotation, and then turn OFF for the additional approximately 180° of its rotation. Focused beams 62 are reflected by facet 65 and reflected beams 66 strike a sheet of film 72 positioned upon a curved writing platen 71 associated with transport 68. Accordingly, beams 66 are "writing" to sheet film 72 for approximately one-half of the continuous rotation of facet 65. The percentage of the rotation of facet 65 during which beam 62 is writing to film 72 may be significantly varied within the teachings of the present invention. Scanner 64 rotates to write a line of an image 76 of film 72. Reflected beams 66 then write a series of pixels to film 72 with intensities that vary in accordance with the output of digital light source 40. In another embodiment, a galvanometer type scanner may be utilized such that the shaft oscillates causing continuous rotation of facet 65 back and forth through less than 360°, instead of continuous rotation.

Film transport 68 includes a translation stage and a translational cylinder 69 where the interior surface of cylinder 69 includes the writing surface, or curved writing platen 71. For each revolution of scanner 64, transport 68 and scanner 64 advance one line width relative to each other in a direction parallel to the central axis of cylinder 69 to complete the writing process. Sheet film 72 is supplied to and, after writing, removed from transport 68 by film handling device 70. In the illustrated embodiment transport 68 uses a vacuum to hold film 72 against cylinder 69. In another embodiment, film 72 could be held in place upon writing platen 71 using clips of another mechanical device. Alternatively, static electricity could be used to hold firm 72 in position.

Linear motion of transport 68 is achieved with a precision translation stage 73, such as a linear motor driven stage. Translation stage 73 causes linear motion of cylinder 69 along an imaginary central axis through cylinder 69. In another embodiment, cylinder 69 may remain stationary and translation stage 73 may move linearly, with respect to cylinder 69. Alternatively, each of translation stage 73 and cylinder 69 may move relative to one another simultaneously.

In yet another embodiment, the cylinder may rotate and the facet could remain stationary, or the two components could rotate simultaneously. In the illustrated embodiment, the line width which cylinder 69 advances for each revolution of facet 65 may be approximately equal to one six-thousandth of an inch, or 4.2 microns.

Translation stage 73 may be manufactured by Anorad Corporation of Hauppauge, N.Y. 11786. The translation stage of the illustrated embodiment comprises an Anorad "7–12 crossed-roller bearing positioning stage" with twelve inch travel, with "Heidenhain linear incremental encoder "with ten micron grating pitch, and Anorad" Model LaL-12 brushless linear DC servo motor with sinusoidal commutation. Transport Controller 88 of FIG. 1B comprises an Anorad IDAC Single-axis Digital Servo Motor Controller.

Figure 4A:
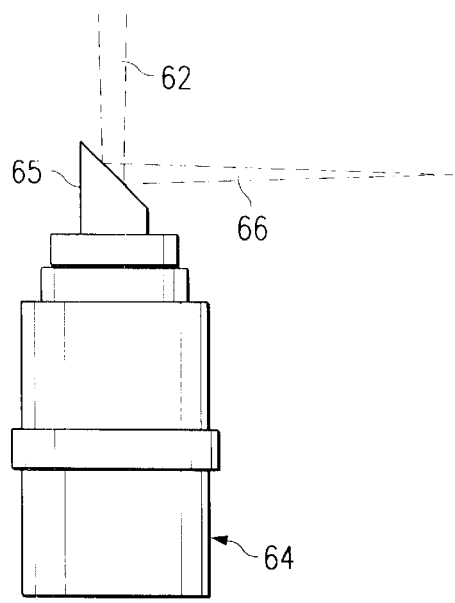
FIG. 4A is a plan view of a single facet scanner, suitable for use within the teachings of the present invention.
Figure 4B:
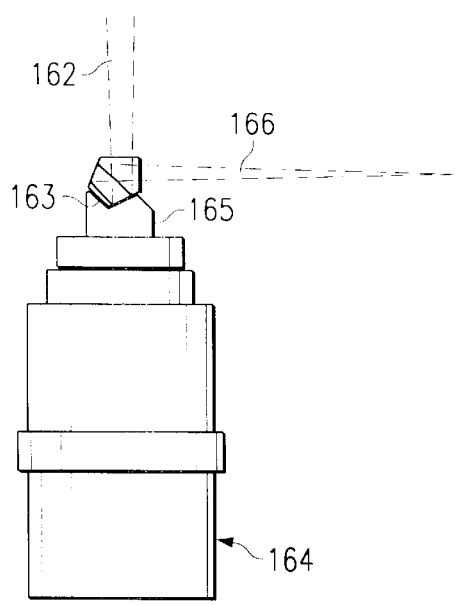
FIG. 4B is a plan view of a multi-facet scanner, also suitable for use within the teachings of the present invention.

The illustrated embodiment incorporates a single facet scanner. A single facet scanner 64 is illustrated in FIG. 4A. In an alternative embodiment, a multi facet scanner may be incorporated to reduce the required degree of wrap (rotation of scanner 64 with respect to writing platen 74) on the writing drum. For example, a two-facet scanner, as shown in FIG. 4B, could be used. As two faceted scanner 164 rotates, first one facet 163 and then the other facet 165 could be used for writing. If multiple facets are illuminated simultaneously, then multiple images can be written simultaneously. Alternatively, two facets could be continuously illuminated with the same beam. With this approach, a high duty cycle could be accomplished with the advantages of a low film wrap introduced by the multi-facet scanner. The multi facet approach also has advantages associated with better dynamic balancing of the scanner.

Figure 4C:
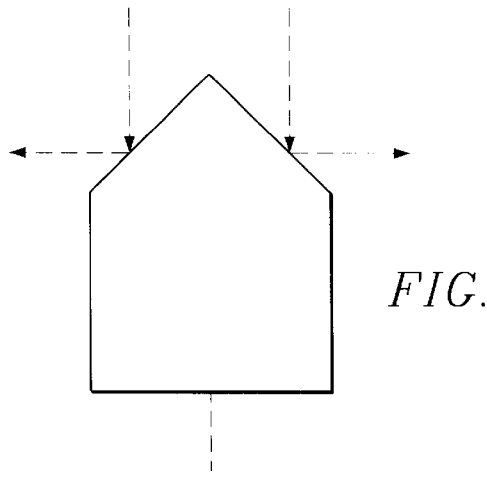
FIG. 4C is a schematic drawing illustrating paths of light beams reflected from the multi-facet scanner of FIG. 4B.

FIG. 4B illustrates a two-faceted spinner, which can write with two beams at once, or can write with a higher writing rate because of an improved duty cycle. The improved duty cycle may be incorporated into a scanner which writes with a 180° wrap, as illustrated in FIG. 2. Although single-faceted scanner 64 would only be writing one-half of the time for a 180° wrap type scanner, two-faceted spinner 164 can be writing nearly all of the time. This potentially doubles the rate of printing achievable with DLIR 30. In FIG. 4C, the axis of rotation is illustrated with the reference numeral 76. Incident beams, or focused laser beams 62a strike two-faceted scanner 165 producing reflected beams 66a.

An alternative design of scanner 64 may incorporate a pentaprism mounted to the rotating shaft in lieu of a flat mirror. The pentaprism will bend the output beam 90° relative to the input beam. This angle is unchanged by small motions of the pentaprism. Hence, the writing spot is undisturbed by vibrations of scanner 64 body or shaft. This approach avoids the problem of banding in the written image induced by vibrations of the scanner.

Figure 1B:
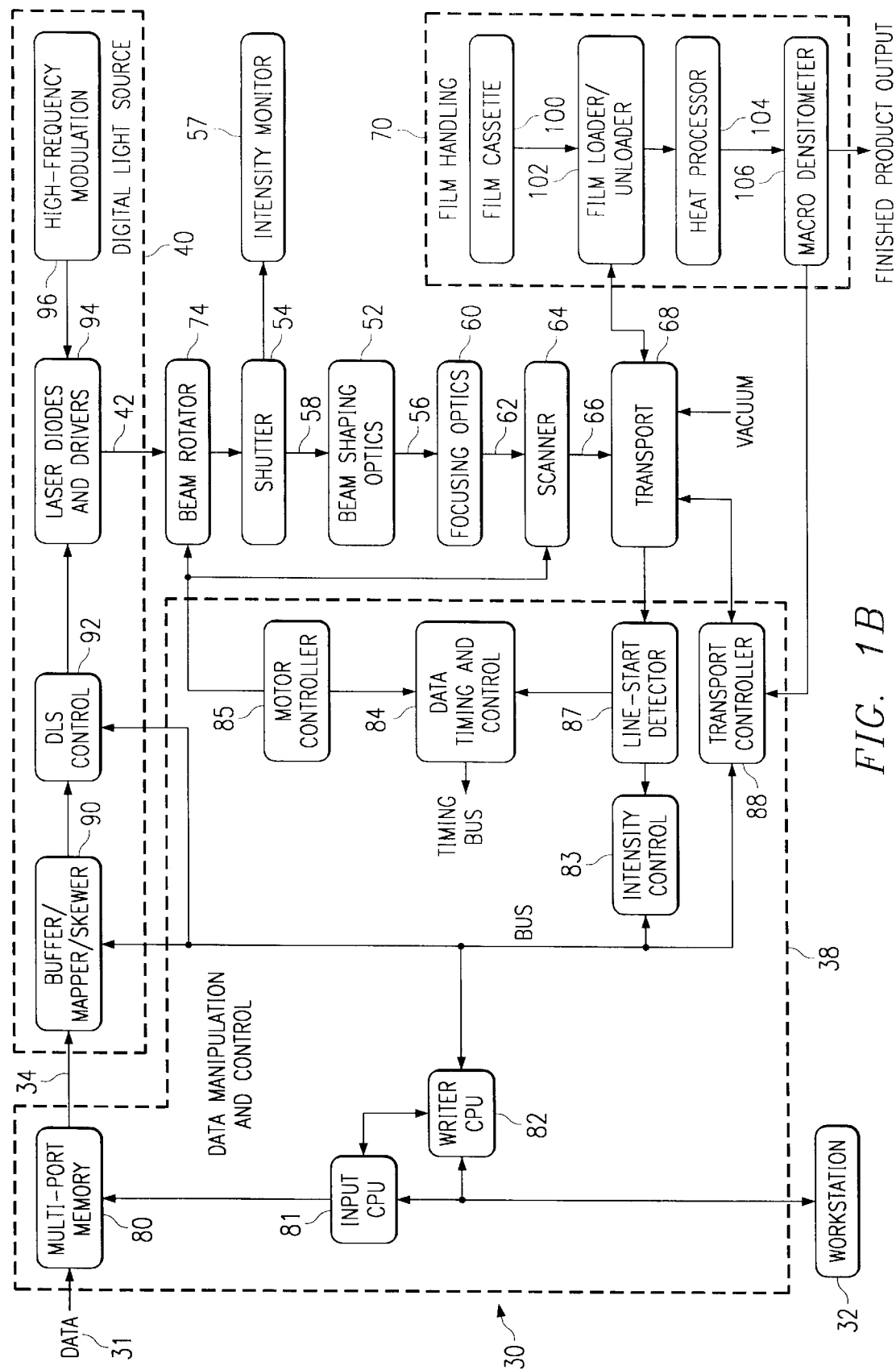
FIG. 1B illustrates another embodiment of the digital laser image recorder of FIG. 1A.

The components of DLIR 30 are illustrated in more detail in FIG. 1B. Data manipulation and control system 38 includes multi-port memory device 80, input central processing unit ("CPU") 81, writer CPU 82, intensity controller 83, data timing and control device 84, motor controller 85, line start detector 87, and transport controller 88. Digital light source 40 includes buffer/mapper/skewer (BMS) card 90, digital light source controller 92, laser diodes and drivers 94 and high frequency modulation device 96. Film handling device 70 includes film cassette 100, film loader/unloader 102, heat processor 104, and macro densitometer 106.

Data 31 is introduced from a workstation 32, preferably including a high speed interface card, to DLIR 30 and ingested by multi-port memory device 80. In the illustrated embodiment, multi-port memory device 80 allows simultaneous data writing and reading for optimum performance. Digital data bitstream 34 is output from multi-port memory device 80 to buffer/mapper/skewer card 90.

Figure 2A:
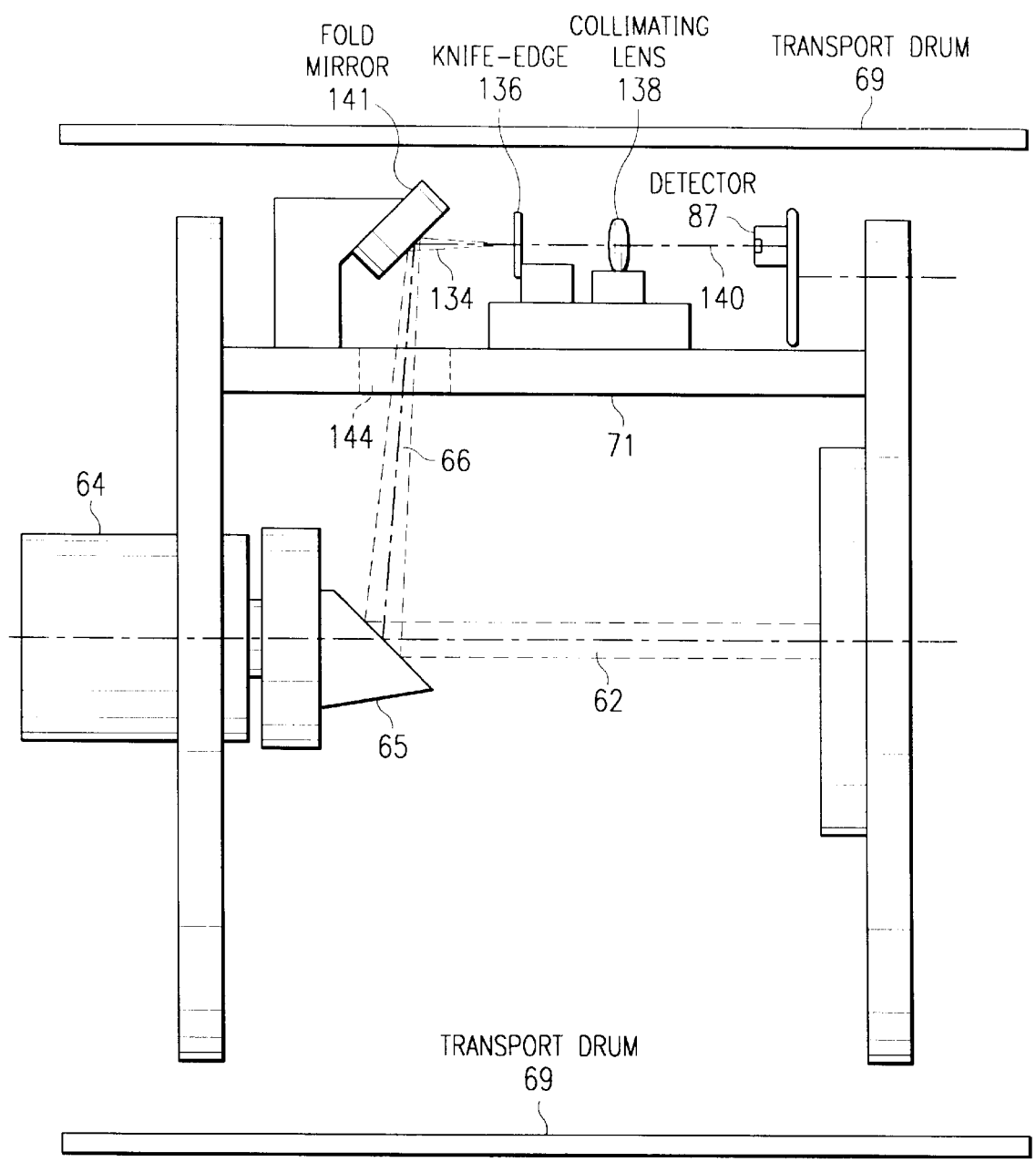
FIG. 2A is a cross-sectional view taken through the transport of FIG. 2, illustrating aspects of a line-start detector associated with the film transport of FIG. 2.
Figure 2C:
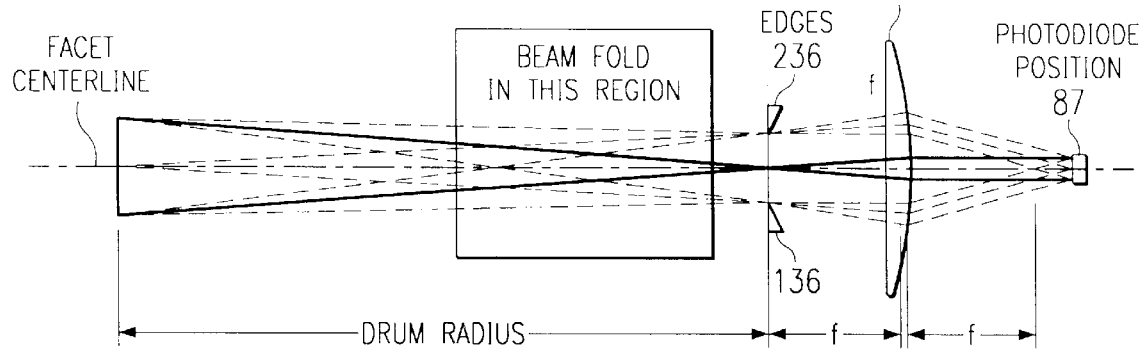
FIG. 2C is a schematic drawing illustrating an optical schematic of the line-start detector optics.

Data timing and control of DLIR 30 is based upon optically detecting the position of reflected beam 66 upon transport 68 as illustrated in FIGS. 2 and 2A. Line-Start Detector 87 coupled with transport 68 provides a precise electrical pulse in response to the passage of an optical beam 134 over a knife-edge 136. Writing beam 66 is selectively allowed to pass through a perforation 144 within writing platen 71 where beam 66 is deflected by fold mirror 141. The precision of the detection of the pulse is a function of the size of optical beam 134 as it crosses knife-edge 136 and of the rise-time of the electrical output of detector 87. To achieve these conditions, the configuration of FIG. 2A is employed. Knife-edges 136 are positioned at the same distance from scanner facet 65 as writing platen 71, so that the best focus on writing platen 71 is achieved when the smallest spot of optical beam 134 crosses knife-edges 136.

For beam intensity monitoring purposes, optical beam 134 must fall onto photodiode, or detector 87 for as long a time as possible. This would require a large photodiode. A low electrical rise time is also required which would imply a small photodiode. Since these are incompatible requirements, the optical configuration of FIG. 2A uses a collimating lens 138 to collimate optical beam 134, to maintain the diameter of the beam constant after lens 138. Photodiode 87 is then positioned at the location where a collimated beam 140 from the first knife-edge 136, the second knife-edge 236, and all points between knife-edges 136 and 236 intersect. This allows use of a sufficiently small photodiode 87 to allow fast electrical rise-times, while maintaining a long duration pulse that allows accurate measurement of the beam intensity.

Referring again to FIG. 1B, initially, a "line-start" pulse generated by line start detector 87 causes buffer/mapper/skewer 90 to read a full line of digital data bitstream 34 from multi-port memory device 80, and output the data serially to Digital Light Source ("DLS") control 92.

Precision motor controller 85 controls translation stage 73 and a motor associated with beam rotator 74, and sets the "line rate" of DLIR 30, for example three hundred lines per second. This is accomplished by controlling the rotational rate of scanner 64 and synchronizing the rotation of beam rotator 74 with the rotation of scanner 64. Precise motion of transport 68 is achieved using transport controller 88 which drives a linear motor (not expressly shown) in translation stage 73.

Electronic components of digital light source 40 include BMS card 90 and digital light source control 92. BMS card 90 associated with digital light source 40 accomplishes many functions. The buffer function of BMS card 90 converts the wide data format to a single byte wide stream. The mapper function uses an eight-bit word input as an index into a table of calibration data for the batch of film in use. The table outputs a twelve-bit value for each input word. The skewer function delays data to twelve laser diodes and drivers 94 associated with digital light source 40 by integer numbers of clock periods. This delay may range from zero to greater than forty clock periods.

The buffer reads data faster than DLIR 30 is intended to write data. The buffer stores data until more data is needed and supplies the data one line at a time to allow continuous, uninterrupted writing. The delay allows a build up of data within BMS card 90 to ensure the presence of data to be transferred to laser diodes and drivers 94 as necessary for continuous writing.

The recorder discussed herein may be used to record images for viewing with the human eye. To understand the reason for encoding the light to a given bit accuracy, the meaning of such encoding and the response of the human eye are discussed herein. This document discusses encoding the light level emitted to DLS 40 to, for example, twelve-bit accuracy. The meaning here follows the common usage employed in digital circuitry and computing. Assume a string of twelve bits is produced from twelve laser diodes associated with DLIR 30. Here, each bit can have two values, one or zero. A string of twelve bits can thus represent two raised to the twelfth power combinations which equals 4096 combinations. The human eye has a logarithmic rather than linear response to changing light levels. That is, for a bright light, a greater absolute change in light level is required to be perceived than if the light is dimmer. In general, the human eye requires a change in brightness equal to about two percent of value for perception. Changes less than two percent will not be perceived. Thus if a 100:1 dynamic range were encoded to more than 233 levels where each level is constant two percent greater than the next lower level, the eye would perceive the result as continuous tone.

Thus the dynamic range could be represented by encoding the exposure to eight-bit accuracy (256 levels) if the levels were logarithmically distributed. When the light levels are encoded in a linear fashion, each level is a constant amount greater than the next lower level rather than a constant percentage greater. To represent a 100:1 dynamic range, more than eight-bits are required to keep the change at the lowest dimmest step within the two percent change requirement. In practice, this means the 100:1 dynamic range must be encoded to about twelve-bit linear accuracy or 4096 levels.

Film calibration of DLIR 30 is performed automatically in DLIR 30. A step-wedge is written onto film 72 and includes a series of sample steps ranging in density from a maximum to a minimum density, and then density readings from each are compared to a predetermined target density for each step. The number of wedges used may range from approximately eight to approximately twenty-five. Density readings from each density step wedge are compared to predetermined target densities for each density step wedge. A digital light source mapper table, associated with BMS Card 90 is then modified prior to making the next exposure. By this process, DLIR 30 is continuously maintained in a calibrated state.

Digital light source control 92 passes high speed data to each laser diode and driver 94, applying fine resolution timing adjustments to compensate for the turn-on delay. Digital light source control 92 also provides low bandwidth control of the light output of each laser diode and driver 94, by adjusting the drive current to the laser diode and driver 94, in response to commands received from intensity controller 83. In the illustrated embodiment, twelve laser diodes, each having an associated driver, are used to achieve 4096:1 dynamic range, as discussed later in more detail.

Figure 5:
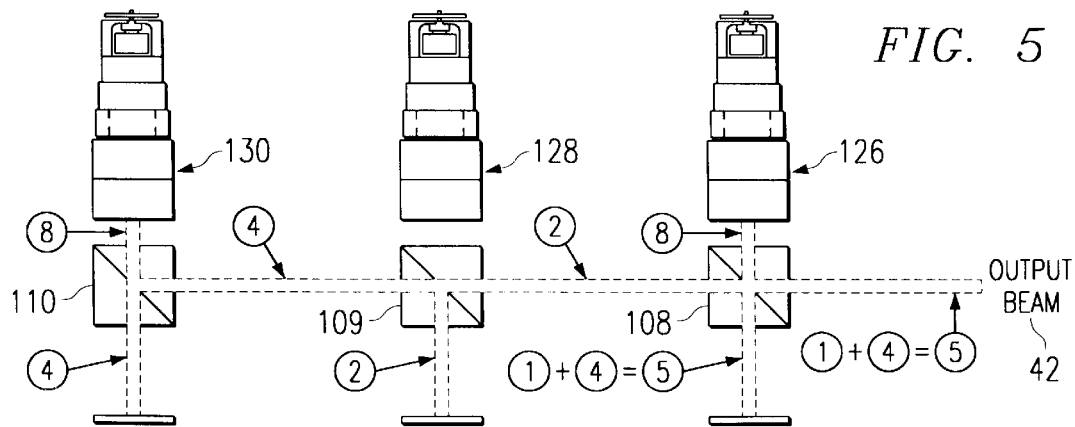
FIG. 5 is a schematic drawing, with portions broken away, illustrating one configuration of laser diodes and drivers, suitable for use within the teachings of the present invention.

The laser diodes and drivers 94 of FIG. 1B include an array of diodes. Each diode has an associated driver comprising a small circuit card that the diode is attached to. FIG. 5 represents the operation of three laser diodes 126, 128, 130, etc. for illustrative purposes. In practice more than three diodes may be used where, for example, twelve diodes will be used to achieve 4096:1 dynamic range. Digital light source 40 uses laser diodes 126, 128 and 130 to convert a digital data bitstream 34 into analog modulated light beam 42. There are several ways to accomplish this function. In one embodiment, diodes 126, 128 and 130 are modulated to either an "ON" or an "OFF" output setting. In another embodiment, modulation of diodes to multiple levels, or modulation of the output of the diodes by pulse width modulation may be utilized. In yet another embodiment, any one of these approaches or any combination of these three approaches may be utilized.

For the embodiment where the diodes are modulated to either an ON or an OFF setting, diodes 126, 128 and 130 nominally output approximately equal power when ON. Diodes 126, 128 and 130 may be combined with a series of beam splitters 108, 109 and 110, such that the light reaching the output beam, or analog modulated light beam 42 from each succeeding more significant bit diode is twice the amount of light reaching the light beam 42 from the preceding less significant bit diode. In the illustrated embodiment, diode 126 is the most significant bit diode and diode 130 is the least significant bit diode.

Each diode 126, 128 and 130 corresponds to one bit in the bit stream. In general more than three diodes may be required to produce an image. For example, if a combination utilizing twelve diodes is utilized and the digital value to be converted is 100100000000, the most significant bit and the fourth most significant bit diodes would be in the ON setting and the other diodes would be OFF. Similarly, all other possible binary combinations could be produced by turning the corresponding diodes ON or OFF, as appropriate. The writing process is a series of commands that turn the diodes ON or OFF in various combinations as dictated by the values in the data words.

Again, FIG. 5 demonstrates one configuration of diodes 126, 128 and 130 for illustrative purposes. Beam splitters 108, 109, and 110 are provided and constructed such that their transmission (T) equals reflection (R) and the output of the diodes is represented by (L). Ideally, T=R=0.5. When diode 126 is turned ON, the amount of light it contributes to analog modulated light beam 42 is equal to L×R, or approximately equal to 0.5 L. When diode 128 is turned ON, the amount of light it contributes to analog modulated light beam 42 is L×R×T, or approximately equal to 0.25 L. This is due to the fact that light emitted from diode 128 encounters two beam splitters 104 and 106. Similarly, when diode 130 is turned ON, the amount of light it contributes analog modulated light beam 42 is L×R×T×T, or approximately equal to 0.125 L. Alternatively, as previously mentioned, this concept can be implemented by utilizing pulse width modulation or direct drive of the diode level as discussed later in more detail.

More specifically, FIG. 5 represents an example where diodes 126 and 130 are ON and diode 128 is OFF. Assuming the output of each diode=L=8, light from diode 126 encounters beam splitter 104 and contributes 0.5L=4 to light beam 42. Diode 128 is OFF and contributes nothing to light beam 42. Light emitted from diode 130 encounters three beam splitters 108, 109 and 110 and contributes 0.125L=1. Therefore, light beam 42 is equal to 1+4=5 for this configuration.

Digital light source 40 is very reliable because it utilizes solid state components. It can function at very high data rates because diodes 126, 128 and 130 can be switched ON and OFF in very short periods of time provides added writing power and can reduce the effects of diode interaction.

The number of laser diodes and drivers 94 associated with digital light source 40 may be varied significantly within the teachings of the present invention. In the particular digital light source discussed above, levels are created by using various combinations of diodes where each diode delivers twice the power of the next least significant diode. Consider two diodes of the digital light source where one diode delivers one unit of light and the other diodes deliver two units. By turning on different combination of diodes, levels of 0, 1, 2, and 3 can be produced. A single diode capable of outputting four levels consisting of levels 0, 1, 2, and 3, could also be used in lieu of the two diodes in the previous implementation. Similarly, a diode capable of outputting eight levels, including zero, could replace three diodes. A diode capable of outputting sixteen levels could replace four diodes, etc. In principle, the entire digital light source could be replaced in this fashion. However, diodes become noisy and unstable at lower levels which limits the number of levels that may be achieved in practice with a single diode. Reducing the number of diodes by outputting more levels per diode offers advantages in the following: packaging, optical complexity, cost effectiveness, improved exposure precision with given number of diodes.

Multi-level diode functionality can be accomplished in a number of ways. The output intensity can be controlled to the appropriate level using detection and feedback circuits.

Alternatively, multiple levels can be achieved by pulse-width modulation of the diode output by controlling the percentage of the time the diode is ON. Pulse wide modulation can be accomplished with one diode by continuously varying the pulse width to achieve the required dynamic range. One way this can be accomplished is to divide the sample period into many sub samples using a clock with a frequency much higher than the sample clock. The laser diode is then turned on for a selected number of sub sample periods to achieve the desired exposure.

In another embodiment, programmable digital delay lines are used to control the pulse width. These are commercial electronic devices that delay the time between input signal and output response for a small time increment that is variable. The exact time period is provided as a digital word command to the device. For example, a digital command of zero could result in a minimum time delay of 5.0 nanoseconds between signal in and signal out. A command of one would then result in a time delay of 5.02 nanoseconds. A maximum delay of 10.1 nanoseconds would result from a command word of 255. The increment of time is set by additional circuitry, and the delay modules can be cascading to result in greater adjustment range. Separate sets of delay modules control the rising and falling edges of each pulse, so pulse width control is simply a matter of sending the correct delay commands to each set of modules. The difference in time delay between the rising edge and falling edge signals is the time width of the output pulse. New commands are provided to the DLS control 83 for each sample period.

Pulse width modulation can also be achieved using combinations of two or more diodes. For example, in one embodiment, the outputs of two diodes are combined with a beam splitter. The beam splitter is constructed so that the exposure reaching the writing surface from one diode is 32 times the exposure reaching the surface from the second diode. Using either of the techniques described above, the exposure from the diodes are each encoded to 5 bit accuracy and modulated over a 32:1 linear dynamic range. Here, for example, level 32 is 32 times as bright as level 1 and twice as bright as level 16. The two diodes are then combined to achieve 32×32=1024 levels which is equivalent to modulating one diode to 10 bit linear accuracy. Here, both diodes are on for most levels. Laser diode interference is minimized by combining the diodes with a polarizing beam splitter so the beams are cross polarized. Other techniques mentioned elsewhere such as injection of high frequency modulation or the use of diodes of different wavelengths may also be used.

In another embodiment, the outputs of two diodes are again combined with a beam splitter. However, in this embodiment the two diodes are never on at the same time. One diode provides the most intense exposures whereas the second diode provides the least intense exposures. A continuous range of exposures is provided by adjusting the beam combiner and the diodes intensities so that the least exposure provided by the higher exposure equals the greatest exposure provided by lower exposure diode. The drives for the two diodes can be made identical if the dynamic range for each diode is the square root of the total dynamic range desired. For example, if a 100:1 dynamic range is required, each diode will operate over a 10:1 dynamic range. Since the two diodes are never on at the same time, the issue of laser diode interaction is completely avoided.

The examples cited above illustrate the principle with a combination of two or more diodes. However, the techniques can be extended to combinations of three or more diodes.

All laser diodes exhibit a characteristic delay between the time that a drive current is applied and the time that the output light reaches its commanded intensity. FIGS. 6A–6E illustrates this behavior. The time interval between the leading edge of the drive pulse and the light pulse is called turn-on Delay. Delay value for a typical diode is on the order of one nanosecond (one billionth of one second). For most laser diode applications, the turn-on delay is of no consequence.

Figure 6A:
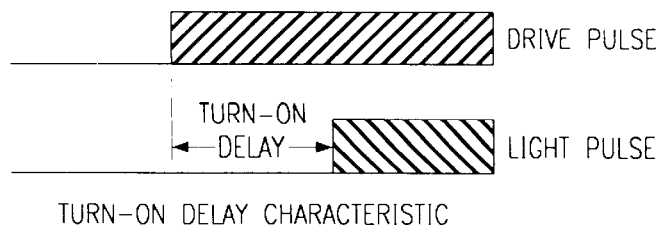
FIGS. 6A–6E illustrates aspects of a turn-on delay characteristic associated with laser diodes.
Figure 6B:
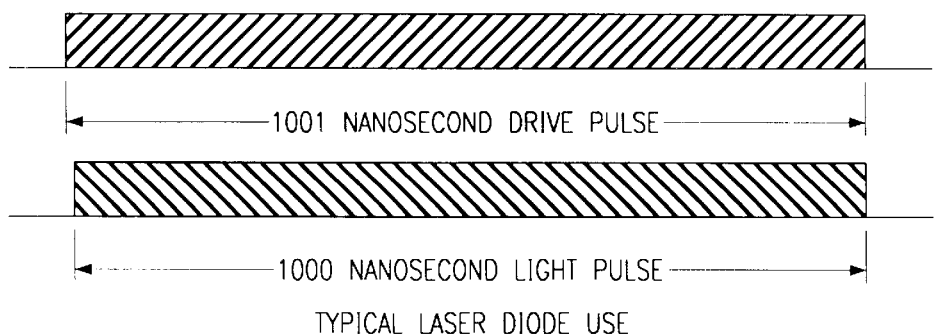
Figure 6C:
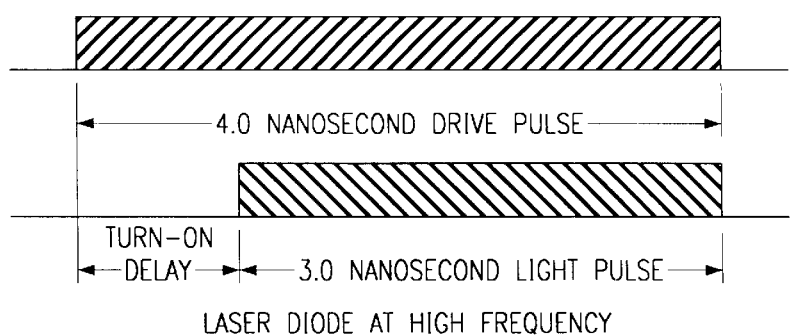

FIG. 6B illustrates the effect of a one nanosecond delay on a one microsecond (1000 nanosecond) long pulse. The effect is less than one-tenth of one percent of the pulse length, which is unmeasurable in most circumstances. At very high operating frequencies, however, the pulse width is much shorter, and the effect of the turn-on delay is significant. FIG. 6C illustrates the significant effect of turn-on delay on a system with a clock frequency of 330 Megahertz (330 million cycles per second). This system outputs 3 nanosecond long pulses. In the illustrated system the turn-on delay effect requires the drive pulse to be thirty-three percent longer than the desired light pulse. If the drive signal was applied for three nanoseconds, the resulting light pulse would be only two nanoseconds long. Electronic circuitry, comprising delay lines and high speed logic gates can be used to compensate for the delays in the diodes.

Figure 6D:
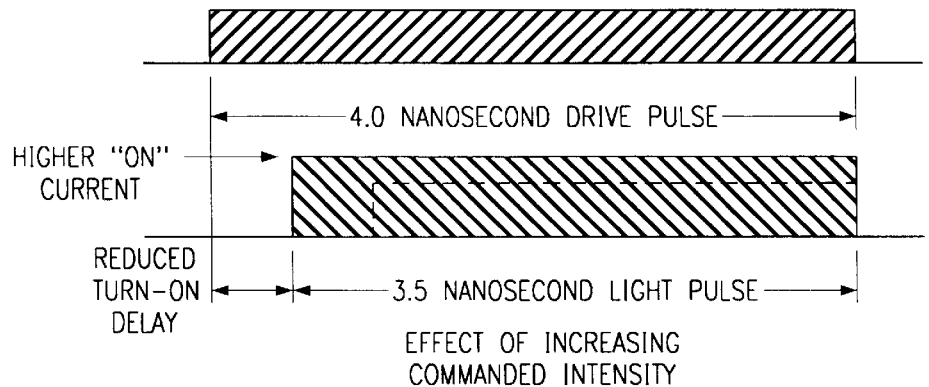
Figure 6E:
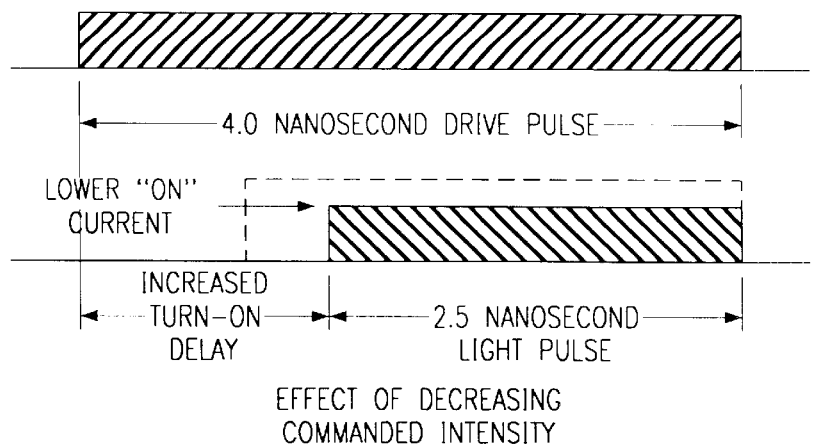

For purposes of the present invention, the problem is more complicated, such that a simple correction, as outlined previously, may not be sufficient. The turn-on delay, which is shown as a one nanosecond delay in the preceding figures, is actually a function of other parameters. If a drive current is applied that will cause the diode to output its maximum light intensity, the turn-on delay will be shortened. As illustrated in FIG. 6D, the higher commanded intensity reduces the turn-on delay to 0.5 nanoseconds. (The dotted line inside the light pulse indicates the pulse envelope prior to the current change.) Conversely, FIG. 6E shows the effect of reducing the commanded drive current. In this case, the turn-on delay increases substantially.

In DLIR 30, the transmission through the optical path varies as scanner facet 65 rotates. At the start of each line the optical transmission may be >10% higher than at the optical transmission at the center of the line, while at the end of the line the optical transmission may be nearly equal to its value at the start of the line. To maintain a constant intensity at the writing spot (the point on film 72 upon which DLIR 30 is writing), the intensity at each laser diode must be varied by the inverse of the change in transmission. These changes are repeatable for each line of data. Intensity controller 83 provides the appropriate digital correction values to DLS Control 92. The application of these corrections causes changes in output level (intensity) that in turn cause turn-on delay variations.

The level induced turn-on delay variations require a dynamic turn-on delay compensation. Dynamic turn-on delay compensation is implemented with programmable delay lines. These are electronic devices that delay the passage of signals by a time increment that is written to the devices.

In the illustrated embodiment, the time required for the laser diodes to begin lasing is dependent upon the applied current. Current through the diode is directly related to diode output power. In order to maintain constant power at the writing spot, the power output of the diode is controlled. A table of delay values is stored in the DLIR for each laser diode. As the beam scans, each diode's ON current digital delay values are updated every 128 data clocks. Thus, sets of delays and currents are provided that keep the actual switching ON time of each diode constant, relative to the data clock pulse during the entire scan. These delay values shift the leading edge of the writing pulse.

Another source of turn-on delay variation is the temperature of the laser diode substrate. A simple explanation for the phenomenon is that the atomic activity in the lasing material increases at higher temperatures, and thus, oscillations are more easily started and built up. Lasing is an oscillatory phenomenon. The temperature of the substrate material is primarily determined by the fraction of the time that the diode has been outputting light in the recent past. If the diode has been on for hundreds of clock periods, and then is OFF for two clock periods, it will begin lasing with less turn-on delay than if it had been OFF for the preceding forty clock periods. In other devices used for writing images, analog electrical time constants, formed of resistor-capacitor networks, are matched to the characteristics of each diode. These give adequate correction of "recent history" induced turn-on delay variation.

In DLIR 30 of the present invention, the thermal profile of the diode is pre-computed, by looking ahead to the next line of data. The temperature of the diode substrate is inferred from the time the diode will be on during the line. Running exponential averages of the ON time of each diode are input to a correction algorithm which is a mathematical model of the thermal behavior of the diode. The output of the algorithm is then added to the correction for level induced turn-on delay and the sum is applied every 128 clock periods during the writing of the line.

Figure 5A:
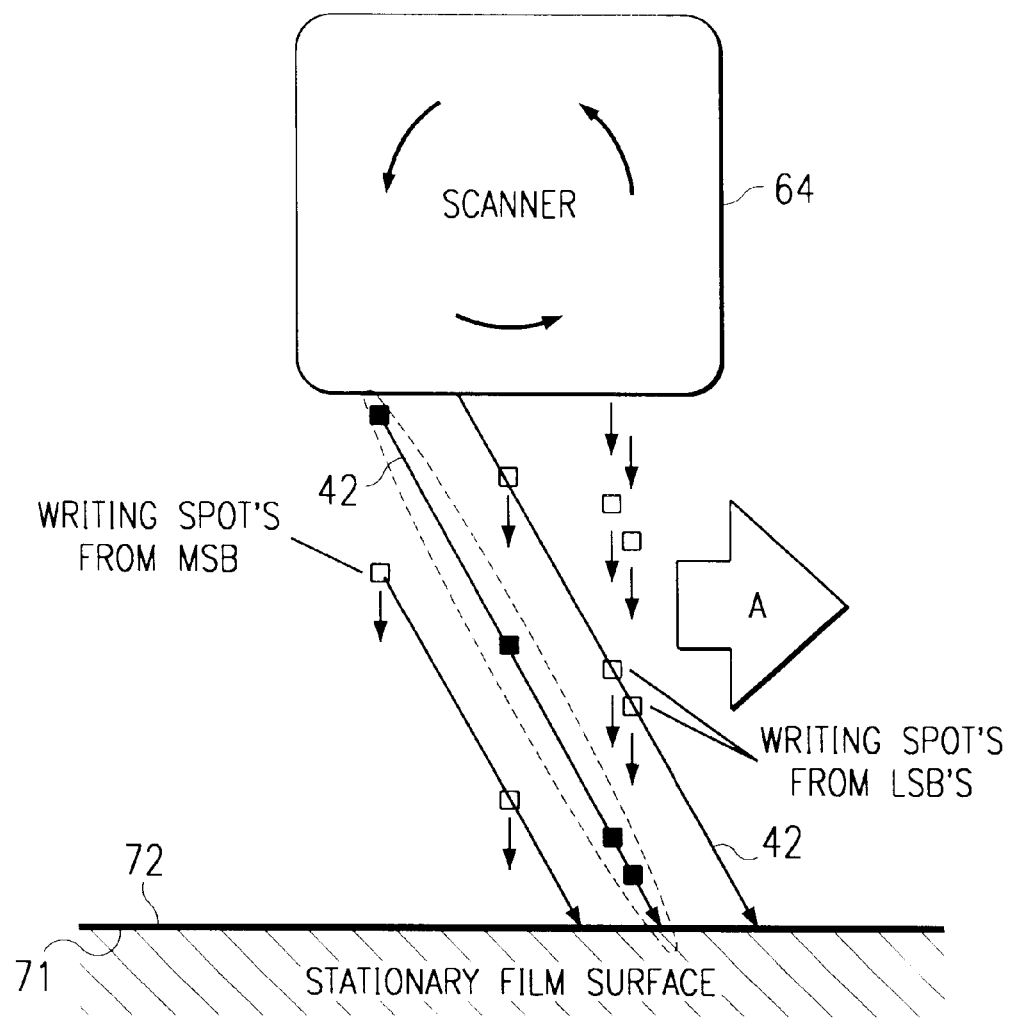
FIG. 5A is a schematic drawing, with portions broken away, illustrating the path of travel of light beams from a scanner to a writing platen.

The writing beams emitted from the laser diodes need not be superimposed, as they are in FIG. 5, within the teachings of the present invention. In the alternative technique of FIGS. 5A and 5B, which will be referred to as "OFF-axis beam injection," analog modulated light beams from diodes 126, 128 and 130 reflect from facet 65 associated with scanner 64. As scanner 64 rotates, beams 42 move across writing platen 71 in a direction generally indicated by arrow A. As shown, least significant bit ("LSB") beams 114 arrive at writing surface 112 ahead of most significant bit ("MSB") beams 116. This concept will work, however, regardless of the order of arrival of the beams. As beams 114 and 116 all sweep past the same points on film 72, the beams do not arrive at the same point on film 72, at the same time. Instead, the timing of each sample is delayed by the time required for beams 114 and 116 to scan past the desired point. Film 72 accumulates energy associated with each beam such that the density at a given spot on the film is the same as if beams 114 and 116 had arrived at exactly the same time.

Figure 5B:
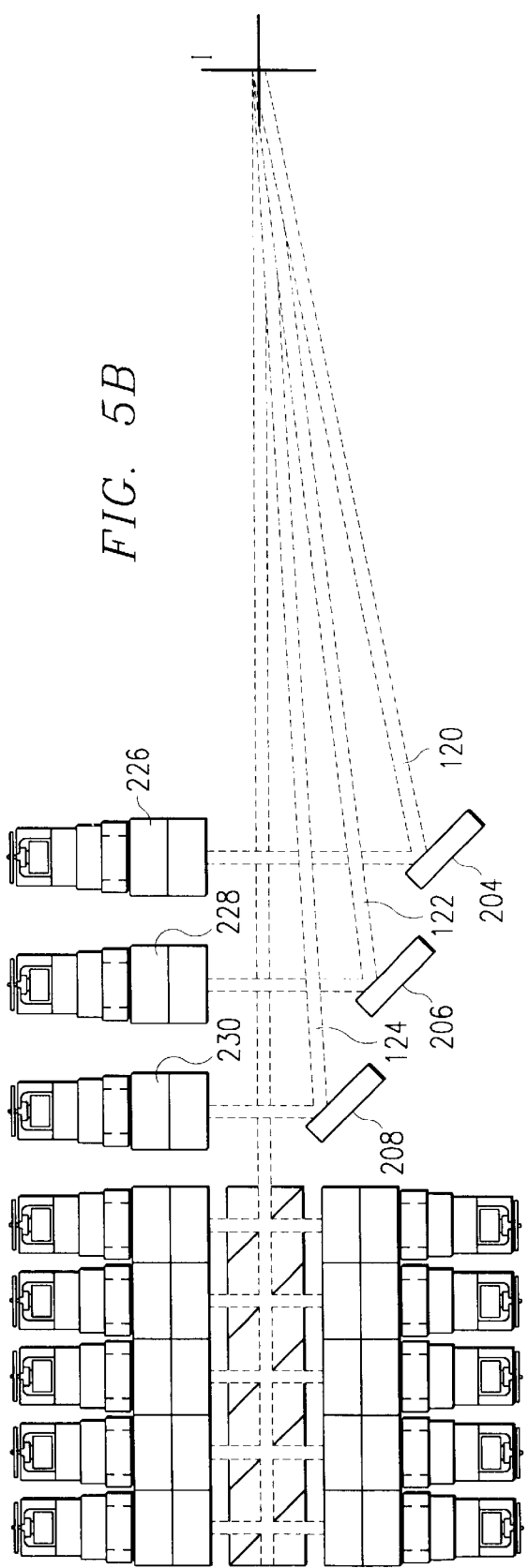
FIG. 5B is a schematic drawing, with portions broken away, illustrating an alternative configuration of laser diodes.

Laser beams that are coaxial at the source will form superimposed writing spots. Laser beams from several diodes 126, 128 and 130, combined as discussed with reference to FIG. 5, are an example of coaxial beams. Alternatively, noncoaxial laser beams may be used, as illustrated in the OFF axis implementation of FIG. 5B. Noncoaxial beams 120, 122, and 124 form non-superimposed writing spots as discussed previously. The configuration illustrated in FIG. 5B has many advantages. Diode interaction problems are solved because writing spots from different diodes are not superimposed and will not interact. Writing power is also increased because noncoaxial injection does not suffer losses of beam injection associated with using beam splitters 204, 206 and 208. As illustrated in FIG. 5B, a "hybrid" combination of laser diodes, including both coaxial and noncoaxial diodes may be used in combination, within the teachings of the present invention.

All of the laser diode configurations discussed above may be used to combine outputs from various diodes of different wavelengths. Using diodes of different wavelengths has many advantages. Problems associated with diode interaction are solved because diodes of different wavelengths do not interfere as with diodes having the same wavelength. This configuration may also produce a color printer. Diodes of different wavelengths can be used to produce writing spots of different colored prints based on the response of the film. This may also annotate film with different wavelength diodes based on the response of the film producing different colors when exposed to different colors.

The system may incorporate another technique to eliminate diode interaction. High frequency diode drive modulation may be used to significantly reduce or even eliminate interaction between diodes. This may be accomplished by modulating the diode drive current at a frequency higher than the clock rate.

Figure 5C:
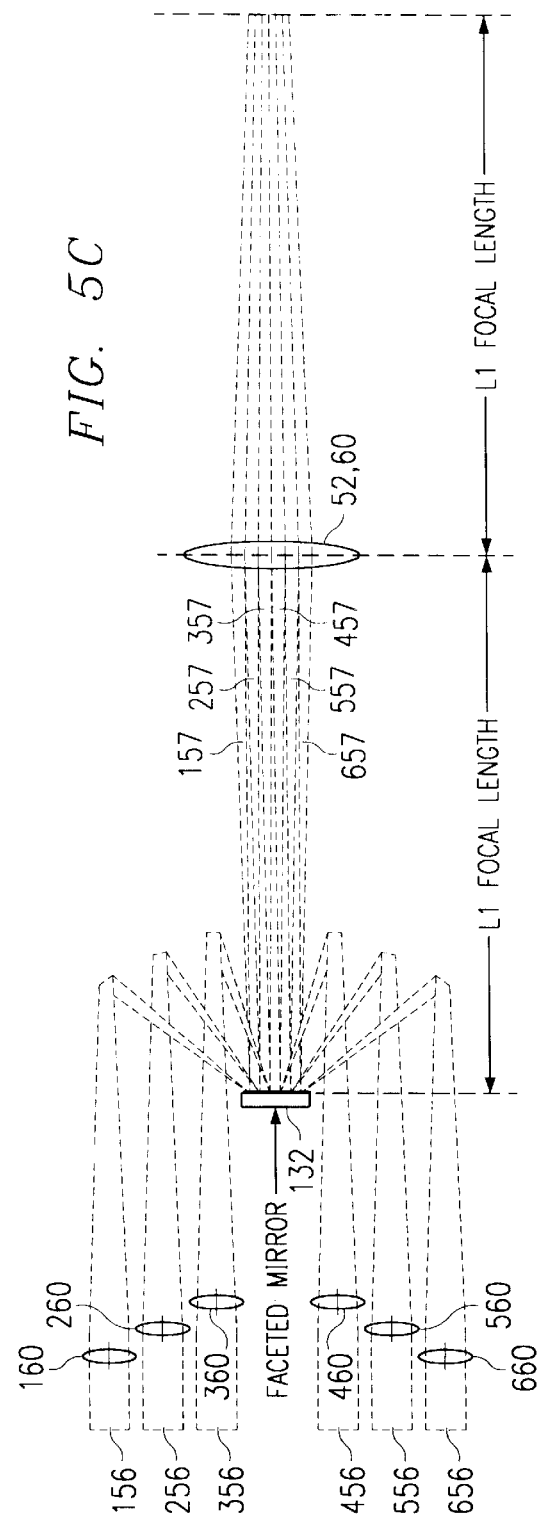
FIG. 5C is a schematic drawing, with portions broken away, illustrating a method of reflecting light beams from multiple laser diodes.

Another method of injecting light beams noncoaxially includes using a multifaceted beam combiner as illustrated in FIG. 5C. In this configuration, six laser diode sources (not expressly shown) direct beams of collimated light 156, 256, 356, 456, 556 and 656 into focusing lenses 160, 260, 360, 460, 560 and 660. Lenses 160, 260, 360, 460, 560 and 660 focus collimated beams 156, 256, 356, 456, 556 and 656 onto small mirror facets associated with mirror 132 angled to reflect the six central rays of the beams parallel to the optical axis of the lens L1. In another embodiment, mirror 132 could comprise a number of smaller mirrors appropriately angled and "sandwiched" together, rather than a single, multi-faceted mirror. The use of faceted mirror 132 allows reflected beams 157, 257, 357, 457, 557 and 657 to be very close together. In the combiner scheme illustrated in FIG. 5B, the minimum spacing achievable is approximately equivalent to the width of beams 120, 122 and 124. The spacing with the multifaceted combiner can be at least ten times smaller than the spacing which may be achieved by the configuration shown in FIG. 5B. The closeness of the beam spacing may be limited by how small the faceted mirrors can be manufactured. All twelve bits of the digital light source can be spaced apart from each other by this method. By comparison, the method shown in FIG. 5B may require impracticably large numerical aperture in the beam shaping and scanning optics if more than four separate beams are used. This method can be used to eliminate diode interaction, since no two beams will be at the same writing position at the same time.

Each writing spot is made up of analog modulated light beams 42 from one or more of the laser diodes and drivers 94. Pixels are nominally written on 4.2 micron centers but may be written at other spacings, within the teachings of the present invention. Each pixel is registered to the others within ten percent of the center-to-center distance. Precise alignment of the DLS is necessary to its proper function. Achieving the required accuracy is made possible by the combined effects of several novel techniques.

When DLIR 30 incorporates coaxial analog modulated light beams 42 as provided by, for example, the configuration of laser diodes 126, 128 and 130 described in FIG. 5, all the beams must be imaged to the same point, since analog modulated light beams 42 will be rotated about their respective axes as scanner 64 rotates.

Figure 7:
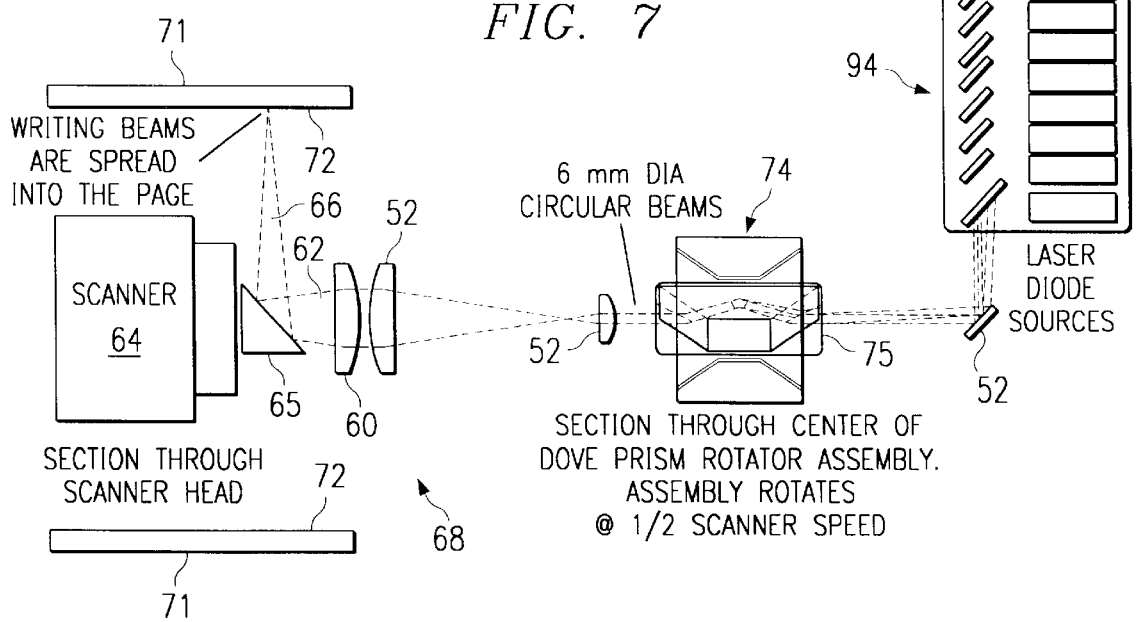
FIG. 7 is a schematic drawing, with portions broken away, illustrating the use of a rotating dove prism assembly, suitable for use with the digital laser image recorder of FIG. 1B.
Figure 7A:
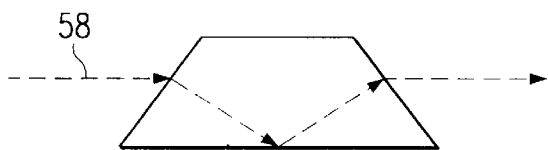
FIG. 7A is a schematic drawing illustrating the path of a light beam through a dove prism.

In another embodiment where DLIR 30 incorporates noncoaxial analog modulated light beams as provided by, for example, the embodiment described in conjunction with FIG. 5B, DLIR 30 may incorporate a beam rotator 74, or dove prism, synchronized with scanner 64, but rotating at half the scanner speed, to maintain the pattern from DLS 40 at a constant angle from the rotatable cylinder axis. This configuration is illustrated in FIGS. 7 and 7A. This allows the along-scan beams to be spread along the scan line instead of requiring them to be coaxial. The alignment requirements are approximately equivalent to the coaxial beam implementation.

Beam rotator 74 comprises a dove prism as illustrated in FIGS. 7 and 7A. Dove prism 75 is used to enhance the writing of a series of spatially separated writing spots. For example, when a line of data is written using the DLIR 30 configuration as illustrated in FIG. 7, the writing beam 66 rotates relative to writing platen 71 as it progresses, due to the geometry of DLIR 30. As discussed with reference to FIG. 5A, writing diodes combined with OFF-axis injection will produce a line of writing spots. A rotating dove prism 75 can be utilized to prevent the line of writing spots from rotating relative to writing platen 71 as scanner 64 rotates. A dove prism is designed not to deflect beam 58, but has the property that as the prism is rotated about the optical axis through a given angle A, the output beam passing through the prism rotates through an angle 2A. A dove prism rotating at a rate of B, can thus be used to compensate for the beam rotational effects of scanner 64 when scanner 64 is rotating at a rate of 2B. A dove prism is illustrated in FIG. 7A, showing the path of the optical beam 58 with arrows. The prism rotates about the optical axis.

Figure 8:
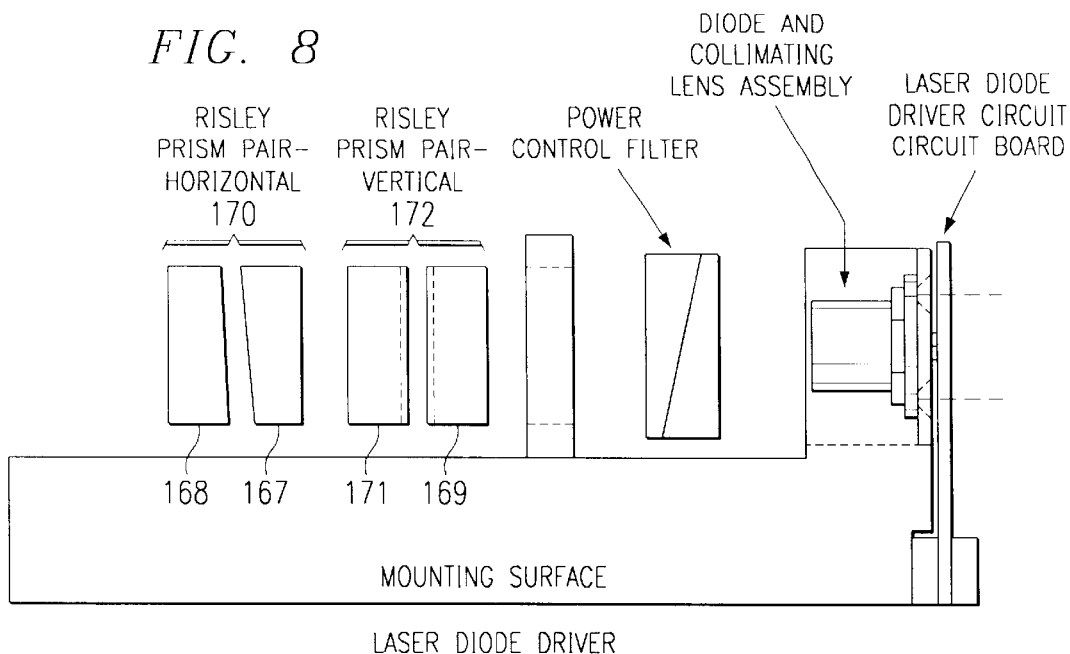
FIG. 8 is a schematic drawing, illustrating the operation of horizontal and vertical Risley prism pairs, suitable for use with the digital laser image recorder of FIG. 1B.
Figure 8A:
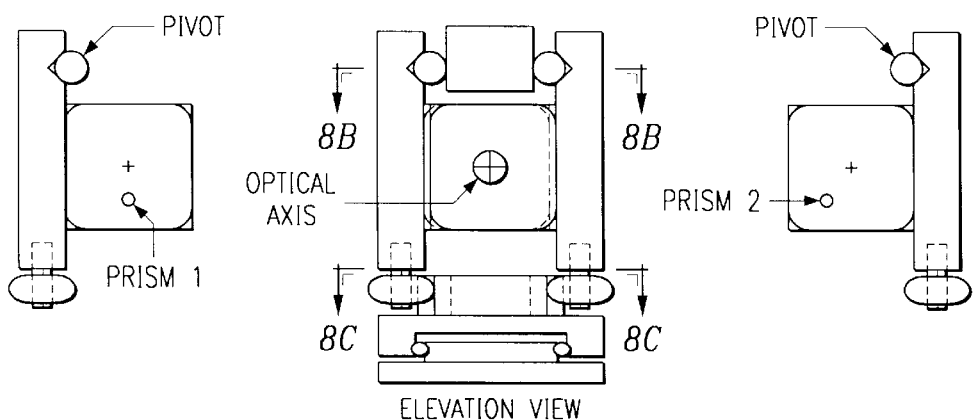
FIG. 8A is an elevation view of the Risley prism pairs of FIG. 8.
Figure 8B:
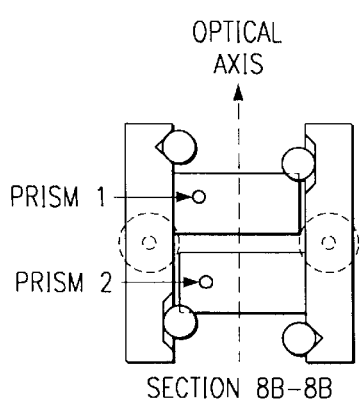
FIG. 8B is a cross-sectional view taken through 8B—8B of FIG. 8A.
Figure 8C:
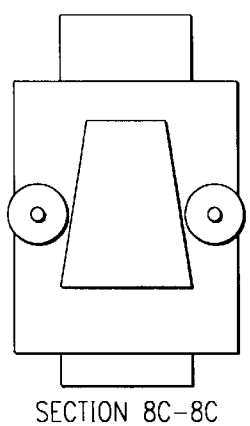
FIG. 8C is a cross-sectional view taken through 8C—8C of FIG. 8A.
Figure 8D:
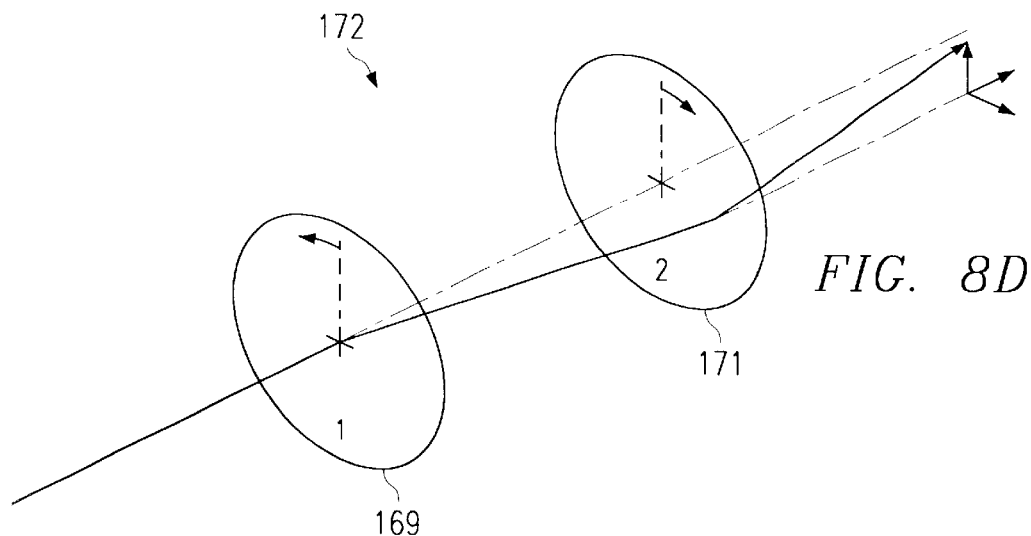
FIGS. 8D–8H are schematic drawings, illustrating aspects of the operation of the Risley prisms of FIG. 8.
Figure 8E:
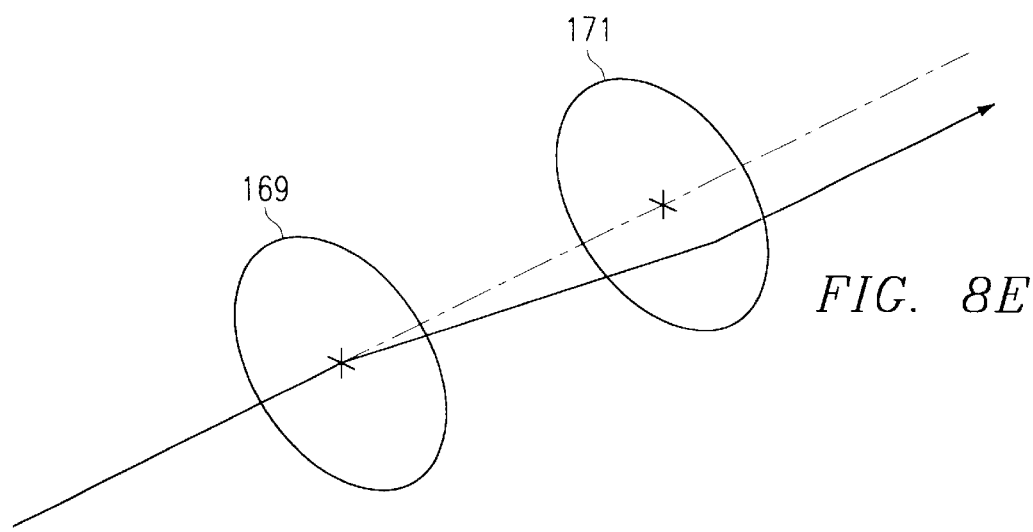
Figure 8F:
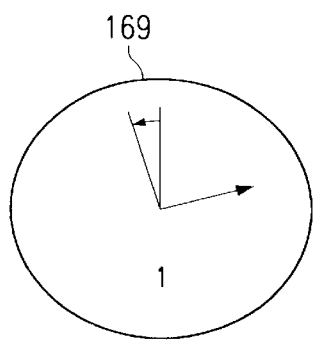
Figure 8G:
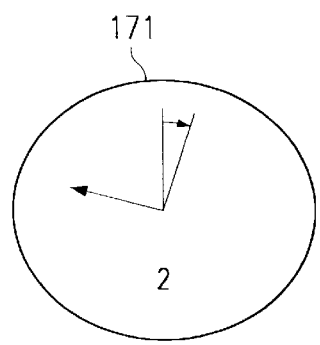
Figure 8H:
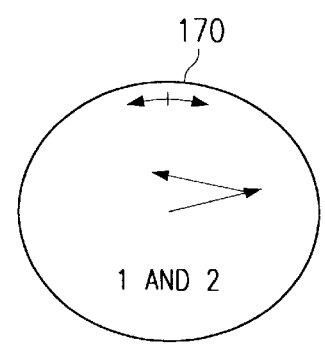
Figure 11:
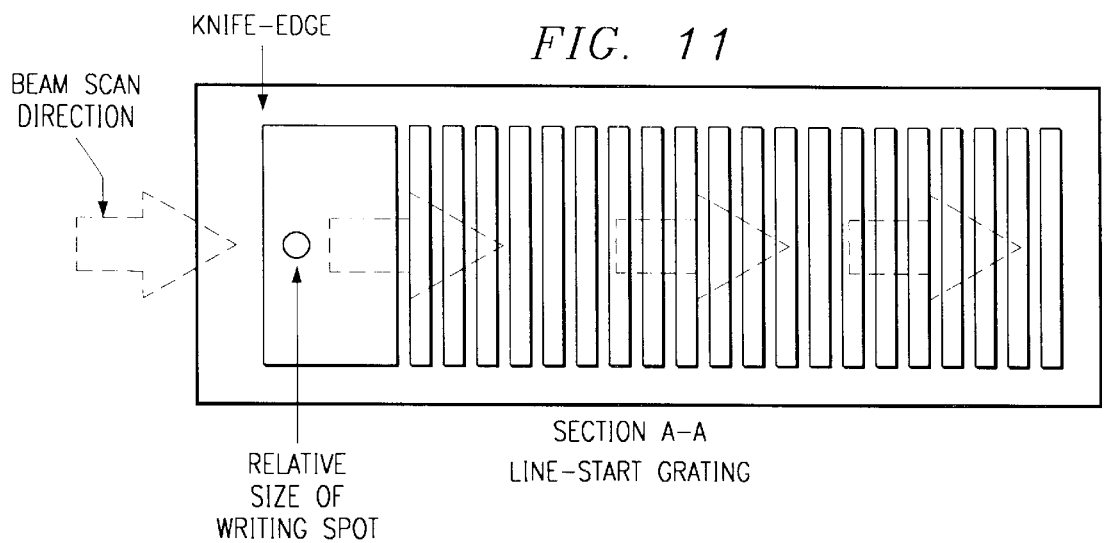
FIG. 11 illustrates additional aspects of a knife-edge associated with the line-start detector of FIG. 2A.
Figure 12:
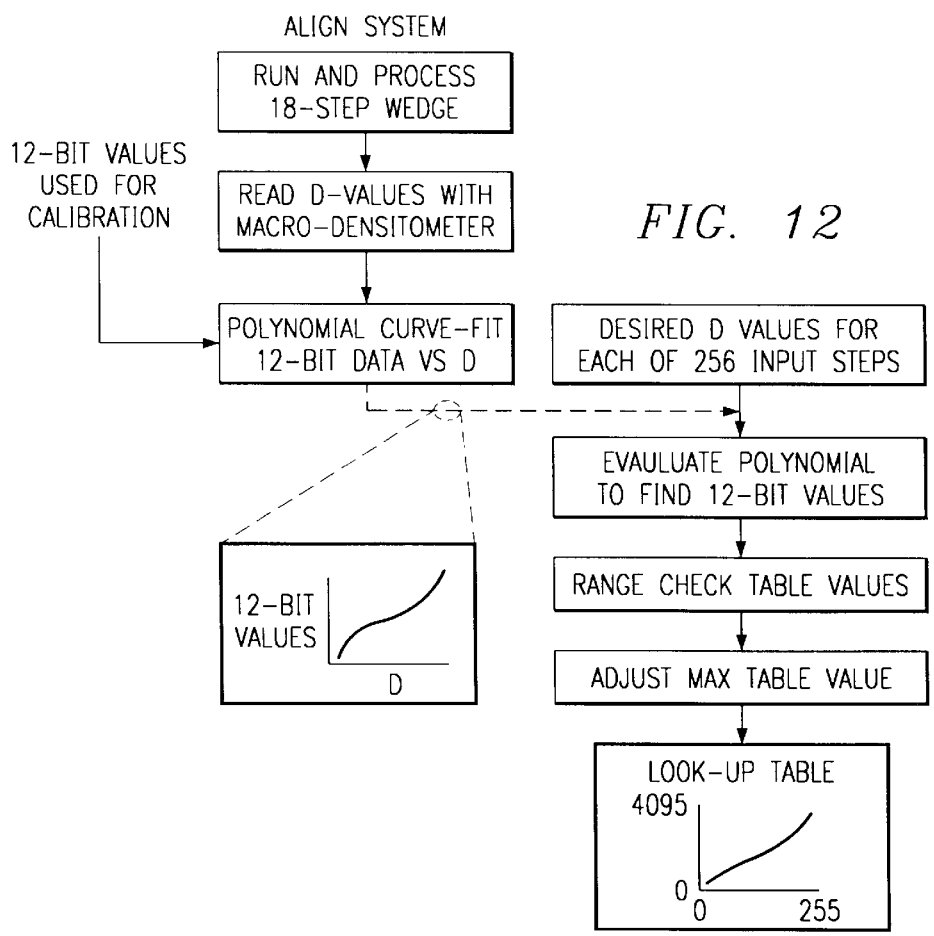
FIG. 12 is a schematic drawing illustrating the operation of a mapper table, suitable for use within the teachings of the present invention.

With reference to the coaxial-type digital light source, for example, FIG. 5, optical alignment of the analog modulated light beams generated by DLS 30 may be accomplished with two pairs of Risley prisms 170 and 172 incorporating a special mechanical drive. This configuration is illustrated in FIGS. 8–8H. The Risley prism pairs may be incorporated into laser diodes and drivers 94 in order to "fine tune" the angle of light beams forming analog modulated light beams 42. Each laser diode, for example diodes 126, 128 and 130, may include two pairs of Risley prisms. One prism pair 172 moves the writing spot along one axis. The other pair 170 moves the spot along an axis orthogonal to the first axis. Accordingly, each laser diode utilizes four Risley prisms to achieve two linear adjustments. This configuration achieves the required very low opto-mechanical gain of 41,000 to 1. One radian of micrometer rotation changes the angle of the source beam by twenty-four micro radians.

The function of a single vertical Risley prism pair 172 is illustrated in FIGS. 8D–8H. Vertical Risley prism pair 172 includes two Risley prisms 169 and 171. The horizontal Risley prism pair 170 is rotated 90° about the optical axis with respect to the vertical pair. The vertical and horizontal adjustments are separate and do not interact during alignment. The spot forming optics focus each beam to a diffraction limited spot. The angle of the source beam 58 incident to the beam shaping optics 52 controls the writing spot position.

Referring to FIGS. 8–8H, two pairs of Risley prisms 170 and 172 are illustrated. Each Risley prism 167, 168, 169, and 171 comprise a section of glass or other material with a slight wedge (for example, 1°). When a beam of light passes through the first prism 168, it is deflected slightly, for example, 0.60°. Similarly, the beam is also deflected slightly for each of the succeeding prisms 167, 171, and 169. The direction of the deflection depends upon the rotational orientation of the wedge. As prism 168 is rotated about a horizontal axis, the output beam will move in a circular arc. If prism 167 is rotated through the same angle but in the opposite direction, the result will be a linear deflection of the beam.

Accordingly, in one direction the deflection effects of the rotation of prisms 167 and 168 add, and in the perpendicular direction, the deflection effects of the rotation of prisms 169 and 171 cancels. If prisms 167 and 168 are suitably oriented, the deflection of the beam will be a linear angular motion in the horizontal direction. Similarly, the second pair of Risley prisms 172 is oriented to provide vertical deflection. Because the deflection is small for a given rotation, very fine adjustments in angle can be accomplished. FIGS. 8A–8C show an assembly of two Risley prism constructed to provide counter-rotation of the Risley prisms to achieve linear motion.

After analog modulated light beams are aligned to make their respective writing spots coincident, the data timing must be adjusted to make each bit in a written spot arrive at precisely the same time. The timing of each laser diode is adjusted to compensate for the variation in delays between laser diode drive channels, and the differing optical path lengths.

With reference to the OFF-axis type digital light source, the alignment problem is separated into cross-scan, or the line-to-line direction and along-scan alignments by the design of the DLIR. The cross-scan direction is vertical at the source and the along-scan direction is horizontal. Adjustment of the analog modulated light beams in the line-to-line direction is done by the pair of Risley prisms with the incorporated mechanical drive. The angle of the source beam incident to the spot forming optics controls the writing spot vertical position. Optical adjustment of the analog modulated light beams in the along-scan direction is only used to center the beams in the writing aperture. This adjustment is not used to control the writing spot position. Only a coarse adjustment by rotating the laser diode source on its base is required at initial assembly to maximize the power through the aperture. The resulting writing spot position, determined by the beam angles entering the focusing optics, is not controlled.

The writing spot is "assembled" on the film. The timing of each diode is adjusted to compensate for the different relative position of each spot along the line. If, for example, the fifth diode is ON for a particular sample on the line, and the fifth diode is 1.34 samples behind the reference position along the line, then the data is delayed to the fifth diode by 1.34 clock periods so that when the writing spot from the fifth diode is over the particular sample spot along the line, it will switch ON and make its contribution to the writing spot.

One advantage of the present invention allows the beams to be separated by relatively large distances and still be accurately timed to arrive at the correct spot. The least significant bits (LSB) of the DLS are nominally colinear, and their timing differences are small compared to the data clock period. The three beams that make up the two most significant bits (MSB) are separated by up to 40 sample spacings, or clock periods.

The timing adjustments required for diode alignment are made by the use of digitally-programmable delay lines. These are electronic components that delay a pulse through them by a time increment that is set by a digital word input to the device. The digital word can range from 0 to 255, and a corresponding multiple of the delay resolution results. In the illustrated embodiment, the time increment used is approximately equal to 100 picoseconds. This provides resolution of approximately one percent of the clock period.

With reference to FIG. 7, in order to accomplish "along-scan" timing control, multiple sets of delay modules 142 may be incorporated into DLS Control 92 of FIG. 1B. These modules 142 independently set the leading and trailing edge of the writing pulse. By moving both the leading and trailing edges of the spot equal amounts, the writing position along the line is controlled.

Coarse, dynamic, along-scan alignment of the analog modulated light beams 42 from each laser diode and driver 94 is done by recording the optical line-start pulse timing of each beam 42 relative to the once per revolution output of a shaft encoder associated with the motor of the scanner. This measurement is used to set the beams timing within one clock period.

Accurate measurements of writing spot position are desirable to perform fine, along-scan alignment. An innovative measurement method that minimizes problems which may be associated with pulse shapes and the transient response of electronic measurement systems is illustrated in FIGS. 10A and 10B.

A lens mounted within cylinder 69, outside the film scanning range, images the writing beam on a ruled grating with equal opaque and transparent spaces. The lens magnifies the writing beam so the beam sample spacing equals the grating pitch. The grating contains about 40 pairs of transparent and opaque lines. A photodiode collects the light passing through the grating. For alignment, DLIR 30 may be set to write a 1 ON - - - 1 OFF pattern with a designated reference laser diode and driver 94 active. On the next line another laser diode and driver 94 writes the same pattern. The two diodes continue this alternative line pattern.

To measure alignment, the programmable delay from the line-start pulse to the start of scan is set to a minimum value. The amount of light passing through the grating from the first reference laser diode and the second laser diode is measured and recorded. Next, the delay is increased by a predetermined increment and the measurement is repeated. This process is repeated as the delay is increased. The intensity through the grating will vary sinusoidally with the delay. The amplitude of the sinusoid will be different for each laser diode, as will the phase. A processing algorithm may be incorporated to calculate the phase difference of the two sinusoids. This phase difference is equal to the relative timing "misalignment" of the diodes. An adjustment of the relative delay of the second diode will then bring it into alignment with the first diode. Each diode in turn is aligned to the reference diode using the same procedure. This method is insensitive to the intensity of the beams, and does not require wide bandwidth photodiodes and amplifiers to make the measurement.

Referring again to FIG. 1B, beam shaping optics 52 perform five functions. First, analog modulated light beam 42 is reshaped to a circular configuration. This is necessary because the output of laser diodes 126, 128, 130 associated with digital light source 40 may be asymmetric. This circularization is accomplished using prisms, as previously discussed. Next, the circularized beam is expanded to a predetermined diameter and collimated. In one embodiment of the present invention, circularization, expansion and collimation may be accomplished using a beam expander (not expressly shown). Stable points in the beam path are then imaged to enhance the overall optical stability of DLIR 30. This can be accomplished by proper optical design involving appropriate selection of lens focal lengths and lens location. The amount of light ultimately reaching the writing plane is controlled by a power control filter incorporated within beam shaping optics 52. In one embodiment, the power control filter includes a wedge-shaped piece of neutral density glass. In order to control the power, the wedge is moved so that the beams go through thicker or thinner portions of the wedge to control power output.

Film cassette 100 holds sheet film 72 which is fed to the writing surface by film loader/unloader 102. Film cassette 100 is removable and periodically reloaded with film as needed. After exposure, film 72 is removed from the transport and transferred to heat processor 104.

Heat processor 104 includes a heated drum. Film 72 is held against the surface of the drum. Since film 72 is fixed by heating, this contact with the heated drum accomplishes the fixing function. Following fixing, the film sheets are past by a light-source/photodiode assembly used to read density step wedges, which were printed for DLIR/Film calibration. Finally, film 72 is placed into an output tray. A commercially available film handling system may be incorporated into DLIR 30.

Although the present invention has been described by several embodiments, various changes and modifications may be suggested to one skilled in the art. It is intended that the present invention encompasses such changes and modifications as fall within the scope of the present appended claims.

What is claimed is:

1. A digital laser image recorder, comprising:

a digital light source;

a data manipulation and control system operable to produce a digital bit stream to the digital light source, the digital light source operable to convert the digital bit stream to an analog modulated light beam;

a transport having a rotatable cylinder with a writing surface disposed upon an interior surface of the rotatable cylinder; and a scanner operable to direct the analog modulated light beams from the digital light source to the writing surface of the transport.

2. The digital laser image recorder of claim 1, wherein the digital light source comprises a plurality of laser diodes and wherein the analog modulated light beam is produced by selectively activating combinations of the plurality of laser diodes.

3. The digital laser image recorder of claim 1, wherein the digital light source produces a plurality of beams, the plurality of beams being adjusted into a single collinear beam.

4. The digital laser image recorder of claim 1, further comprising beam shaping optics to convert the analog modulated light beams to collimated beams of a predetermined size and circular distribution.

5. The digital laser image recorder of claim 4, wherein the beam shaping optics further comprises a power control filter to control the intensity of the collimated beams.

6. The digital laser image recorder of claim 1, further comprising a shutter having a first position in which a reflective surface associated with the shutter reflects the analog modulated light beams away from the scanner, and a second position in which the analog modulated light beams are allowed to strike the scanner.

7. The digital laser image recorder of claim 6, further comprising a photodiode for monitoring the intensity of the analog modulated light beams which are reflected by the shutter.

8. The digital laser image recorder of claim 4, further comprising focusing optics operable to focus the collimated beams to form focused laser beams which are directed toward the scanner.

9. The digital laser image recorder of claim 1, further comprising a film handling device operable to supply a sheet film to the writing surface.

10. The digital laser image recorder of claim 9, wherein the film handling device is operable to remove the sheet film from the writing surface and deliver the sheet film to an output tray.

11. The digital laser image recorder of claim 1, wherein the transport further comprises a vacuum operable to releasably attach a sheet film to the writing surface.

12. A digital laser image recorder, comprising:
a digital light source;
a data manipulation and control system producing a digital bitstream applied to the digital light source, the digital light source operating to convert the digital bitstream to an analog modulated light beam;
a transport having a rotatable cylinder with a writing surface disposed on an interior surface of the rotatable cylinder;
a shaft having a first reflect facet mounted thereon; and
a motor coupled to the shaft to rotate the shaft through at least partial revolutions.

13. The digital laser image recorder of claim 12, wherein the shaft comprises an air-bearing supporting shaft.

14. The digital laser image recorder of claim 12, wherein the reflective facet is coupled with the shaft at a 45° angle with respect to a central axis of the shaft.

15. The digital laser image recorder of claim 12, further comprising a second reflective facet coupled with the shaft.

16. The digital laser image recorder of claim 12, wherein the motor further comprises a shaft encoder operable to measure the rotational speed of the motor.

17. The digital laser image recorder of claim 16 further comprising an electronic motor controller operable to receive information regarding the rotational speed of the motor from the shaft encoder and adjust the rotational speed of the motor based upon the information.

18. The digital laser image recorder of claim 12, wherein the shaft and facet continuously rotate through 360° revolutions.

19. The digital laser image recorder of claim 12, wherein the digital laser image recorder comprises a galvanometer type scanner operable to rotate the shaft through less than 360° in a first direction and rotate the shaft through less than 360° in a second direction, opposite the first direction.

20. The digital laser image recorder of claim 12, wherein the facet further comprises a pentaprism operable to bend the light beam 90°.

21. A digital laser image recorder, comprising:
a digital light source;
a data manipulation and control system producing a digital bitstream applied to the digital light source, the digital light source converting the digital bitstream to an analog modulated light beam;
a transport comprising:
a translation stage;
a translation cylinder slottably coupled with the translation stage and having an interior surface comprising a curved writing platen;
an image recording medium disposed on the interior surface of the translation cylinder; and
a scanner operable to direct the analog modulated light beams from the digital light source toward the curved writing platen.

22. The digital laser image recorder of claim 21, wherein the transport and the scanner advance one line width, relative to the scanner, for each revolution of the scanner, in a direction parallel to the central axis of the cylinder.

23. The digital laser image recorder of claim 21, wherein the line width is approximately equal to four and two tenths microns.

24. The digital laser image recorder of claim 21, wherein a vacuum removably couples the sheet of film with the writing platen.

25. The digital laser image recorder of claim 21, wherein static electricity removably couples the sheet of film with the writing platen.

26. The digital laser image recorder of claim 21, further comprising a line start detector operable to produce an electrical pulse in response to the passage of the beam of light over a knife edge, the line start detector and the knife edge coupled with the translational cylinder.

27. The digital laser image recorder of claim 21, further comprising a collimating lens coupled with the translational cylinder between the knife edge and the detector and operable to collimate the beam of light to maintain a constant diameter of the beam to facilitate precise measurement of the beam by the detector.

28. A digital laser image recorder, comprising:
a digital light source;
a data manipulation and control system producing a digital bitstream applied to the digital light source, the digital light source converting the digital bitstream to an analog modulated light beam;
a transport having a rotatable cylinder with a writing surface disposed on an interior surface of the rotatable cylinder;
a scanner operable to direct the analog modulated light beams from the digital light source to the writing surface of the transport, the scanner comprising a beam combiner having a reflecting mirror with a plurality of facets thereon, the facets each disposed at different angles with respect to a central axis of the beam combiner; and
the facets reflecting the light beams parallel to an optical axis associated with a receiving lens.

29. A light source for a laser image recording device, comprising:
a plurality of laser driven diodes converting digital data to analog modulated light beams;
digitally-programmable delay lines associated with the laser driven diodes to delay a pulse received by the delay line for a predetermined time increment corresponding to a digital word input received by the delay line; and
a plurality of beam splitters, each beam splitter corresponding with at least one of the laser driven diodes.

30. The light source of claim 29, further comprising:
a plurality of horizontal Risley prism pairs and a plurality of vertical Risley prism pairs, each horizontal Risley prism pair and vertical Risley prism pair corresponding to at least one of the laser driven diodes;
each horizontal Risley prism pair and each vertical Risley prism pair incorporating at least two Risley prisms;
each horizontal Risley prism pair operable to adjust the light beams along first axes;
each vertical Risley prism pair operable to adjust the light beams along second axes, orthogonal to the first axes; and
a mechanical drive operable to rotate the horizontal and vertical Risley prisms in a predetermined sequence.

* * * * *